United States Patent
Beattie, Jr. et al.

(10) Patent No.: US 11,368,218 B2
(45) Date of Patent: *Jun. 21, 2022

(54) ENHANCEMENT OF OPTICAL COMMUNICATIONS AND OPTICAL FIBER PERFORMANCE

(71) Applicant: AT&T Intellectual Property I, L.P., Atlanta, GA (US)

(72) Inventors: James Gordon Beattie, Jr., Bergenfield, NJ (US); Timothy Innes, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,208

(22) Filed: Jan. 20, 2021

(65) Prior Publication Data
US 2021/0143909 A1  May 13, 2021

Related U.S. Application Data

(63) Continuation of application No. 16/399,906, filed on Apr. 30, 2019, now Pat. No. 10,931,376.

(51) Int. Cl.
*H04B 10/70* (2013.01)
*H04J 14/02* (2006.01)
(Continued)

(52) U.S. Cl.
CPC ....... *H04B 10/25* (2013.01); *H04B 10/07957* (2013.01); *H04B 10/2513* (2013.01);
(Continued)

(58) Field of Classification Search
CPC .. H04B 10/70; H04B 10/25; H04B 10/07957; H04J 14/0227; H04J 14/08–086
See application file for complete search history.

(56) References Cited

U.S. PATENT DOCUMENTS

| 5,969,806 A | 10/1999 | Bergano |
| 6,262,828 B1 | 7/2001 | Akiyama et al. |

(Continued)

FOREIGN PATENT DOCUMENTS

| EP | 1 024 541 A2 | 8/2000 | |
| EP | 1024541 A2 * | 8/2000 | ............. H01L 49/00 |

(Continued)

OTHER PUBLICATIONS

Non Final office action received for U.S. Appl. No. 16/399,906 dated Jan. 23, 2020, 40 Pages.
(Continued)

*Primary Examiner* — Nathan M Cors
(74) *Attorney, Agent, or Firm* — Amin, Turocy & Watson, LLP

(57) ABSTRACT

Communication of light signals and optical cables can be managed to mitigate error associated with using optical cables to communicate light signals. A communication management component (CMC) can embed respective timing synchronization pulses in respective lights signals having respective wavelengths. The light signals can be typical light signals or can be squeezed and twisted to generate a desired twisted light signal. The light signals can be transmitted via the optical cable to a receiver. A CMC, at the receiver end, can determine error associated with the transmission of the light signals via the optical cable and respective characteristics of the respective light signals, including respective arrival times of the respective timing synchronization pulses and respective light intensity or power levels of the respective light signals. From the respective characteristics, CMC can determine a compensation action to perform mitigate the error with regard to subsequent transmissions of light signals.

20 Claims, 15 Drawing Sheets

(51) Int. Cl.
| | |
|---|---|
| *H04B 10/25* | (2013.01) |
| *H04B 10/079* | (2013.01) |
| *H04B 10/2569* | (2013.01) |
| *H04B 10/2513* | (2013.01) |
| *H04B 10/61* | (2013.01) |
| *H04B 10/40* | (2013.01) |

(52) U.S. Cl.
CPC ......... *H04B 10/2569* (2013.01); *H04B 10/40* (2013.01); *H04B 10/6162* (2013.01); *H04B 10/70* (2013.01); *H04J 14/0227* (2013.01)

(56) References Cited

U.S. PATENT DOCUMENTS

| | | | |
|---|---|---|---|
| 6,570,682 | B2 | 5/2003 | Robinson et al. |
| 6,573,985 | B2 | 6/2003 | Ibukuro et al. |
| 6,734,955 | B2 | 5/2004 | Wight et al. |
| 6,801,306 | B2 | 10/2004 | Fontaine |
| 7,269,314 | B2 | 9/2007 | Oikawa |
| 7,536,108 | B2 | 5/2009 | Hirano et al. |
| 7,630,650 | B2 | 12/2009 | Hoshida et al. |
| 8,135,275 | B2 | 3/2012 | Heismann et al. |
| 8,467,690 | B2 | 6/2013 | Kim et al. |
| 8,472,814 | B2 | 6/2013 | Zhang et al. |
| 8,909,061 | B1 | 12/2014 | Varadarajan |
| 9,584,217 | B2 | 2/2017 | Bottari et al. |
| 9,621,299 | B2 | 4/2017 | Ishihara et al. |
| 9,825,708 | B2 | 11/2017 | Fan et al. |
| 10,090,917 | B2 | 10/2018 | Searcy et al. |
| 10,203,264 | B2 | 2/2019 | Preston et al. |
| 10,506,312 | B1 | 12/2019 | Innes et al. |
| 10,931,376 | B2* | 2/2021 | Beattie, Jr ............... H04J 14/02 |
| 2003/0231886 | A1* | 12/2003 | Young ................. H04J 14/0241 398/101 |
| 2005/0226628 | A1* | 10/2005 | Watanabe ........ H04B 10/25133 398/147 |
| 2010/0067902 | A1* | 3/2010 | Sun .................... H04B 10/0799 398/25 |
| 2017/0093493 | A1 | 3/2017 | Therrien et al. |
| 2017/0353242 | A1 | 12/2017 | Mansouri Rad et al. |

FOREIGN PATENT DOCUMENTS

| | | |
|---|---|---|
| EP | 1 819 071 A1 | 8/2007 |
| WO | 2018/196056 A1 | 11/2018 |

OTHER PUBLICATIONS

Final office action received for U.S. Appl. No. 16/399,906 dated Jul. 1, 2020, 25 Pages.

Lowery, et al. "Performance of optical OFDM in ultralong-haul WDM lightwave systems" Journal of Lightwave Technology 25.1 (2007): 131-138.

Cochrane, et al. "Wavelength-dependent measurements of optical-fiber transit time, material dispersion, and attenuation" Applied optics 40.1 (2001 ): 150-156.

Smith, et al. "Overcoming chromatic-dispersion effects in fiber-wireless systems incorporating external modulators" IEEE transactions on microwave theory and techniques 45.8 (1997): 1410-1415.

University of Vienna. "New records set up with 'Screws of Light'" Science Daily, [htlps:I/www.sciencedaily.com/releases/2016/11/161116102013.htm] Nov. 16, 2016, retrieved Jan. 22, 2020, 4 pages.

Bell, Lee. "Physicists discover new form of light that could power quantum computers" Wired, [http:l/www.wired.co.uk/article/scientists-develop-light-quantum-computers], Aug. 9, 2016, retrieved Jan. 22, 2020, 8 pages.

Wiikipedia. "Topological insulator" [hllps:1/en.wikipedia.org/wiki/Topological_insulator] retrieved Jan. 22, 2020, 13 pages.

Wikipedia. "Quantum cloning" [htlps:1/en.wikipedia.org/wiki/Quantum_cloning] retrieved Jan. 22, 2020, 8 pages.

Ellis et al. "Communication networks beyond the capacity crunch" [hllps://www.ncbi.nlm.nih.gov/pmc/articles/PMC4733922] Philos Trans A Math Phys Eng Sci. Mar. 6, 2016; 374(2062): 20150191, retrieved Jan. 22, 2020, 14 pages.

Mori, et al. "Modal dispersion compensation by using digital coherent receiver with adaptive equalization in multi-mode fiber transmission" Optical Fiber Technology 19 (2013) 132-138.

Omomukuyo, et al. "Bandwidth-Efficient Synchronization for Fiber Optic Transmission: System Performance Measurements" IEEE Instrumentation & Measurement Magazine ( vol. 20, Issue: 5, Oct. 2017) 13 pages.

Predojević, Ana. "Rubidium resonant squeezed light from a diode-pumped optical-parametric oscillator" Apr. 8, 2009, doctoral thesis, ICFO-Institut de Ciencias Fototoniques & Departement de Fisica Aplicada , Simulaci6n en Ciencias de Universidad Politecnica de Catalunya, 78 pages.

Diebold, et al. "Giant tunable optical dispersion using chromomodal excitation of a multimode waveguide" Nov. 21, 2011 / vol. 19, No. 24 / Optics Express, 9 pages.

Willner, et al. "Optical communications using orbital angular momentum beams" Advances in Optics and Photonics 7 , 56-106 (2015).

* cited by examiner

ENHANCEMENT OF OPTICAL COMMUNICATIONS AND OPTICAL FIBER PERFORMANCE

RELATED APPLICATION

The subject patent application is a continuation of, and claims priority to, U.S. patent application Ser. No. 16/399,906 (now U.S. Pat. No. 10,931,376), filed Apr. 30, 2019, and entitled "ENHANCEMENT OF OPTICAL COMMUNICATIONS AND OPTICAL FIBER PERFORMANCE," the entirety of which application is hereby incorporated by reference herein.

TECHNICAL FIELD

This disclosure relates generally to optical communications, e.g., to enhancement of optical communications and optical fiber performance.

BACKGROUND

Various services and applications can rely on fast, efficient, and reliable information exchange. Currently, much of this information traffic is carried over long distances by optical fiber, which can have intrinsic advantages, such as wide transmission bandwidth and low attenuation. However, continuing traffic growth can impose a number of significant challenges, including with regard to development of optical transmission systems that can handle the increasing demand for higher data rates in a financially feasible and cost effective manner.

The above-described description is merely intended to provide a contextual overview regarding optical communications, and is not intended to be exhaustive.

DETAILED DESCRIPTION

Figure 1:
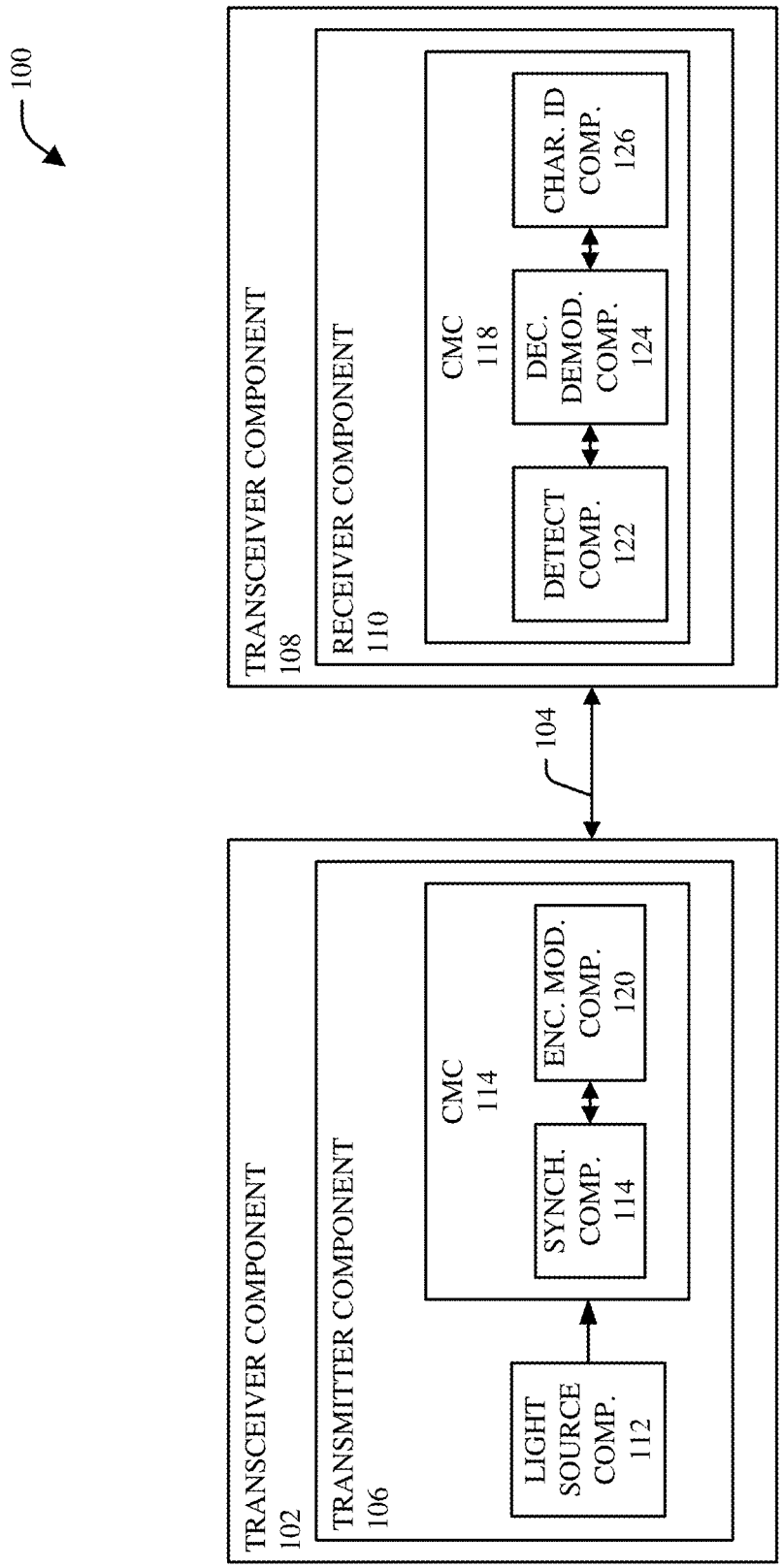
FIG. 1 illustrates a block diagram of an example system that can manage communication of light signals and optical cables used to communicate the light signals to mitigate error associated with using optical cables to communicate light signals, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Various services and applications can rely on fast, efficient, and reliable information exchange. Currently, much of this information traffic is carried over long distances by optical fiber, which can have intrinsic advantages, such as wide transmission bandwidth and low attenuation. However, continuing traffic growth can impose a number of significant challenges, including with regard to development of optical transmission systems that can handle the increasing demand for higher data rates in a financially feasible and cost effective manner.

To that end, techniques for managing communication of light signals and optical cables (e.g., fiber optic cables) used to communicate the light signals to mitigate error associated with using optical cables to communicate light signals are presented. A transceiver component can comprise a communication management component (CMC). The CMC can be or can comprise an optical signal processor. With regard to the transmission end, the CMC can embed respective timing synchronization pulses in respective lights signals having respective wavelengths (e.g., respective optical carriers having respective wavelengths). In accordance with various embodiments, the light signals can be typical light signals from a light source component, or the CMC can process the lights signal to squeeze and twist the light signals to generate a desired twisted light signal. An encoder/modulator component can encode information and/or error correction information into the light signals. The transceiver component (e.g., the transmitter component of the transceiver component) can transmit the respective light signals, comprising the respective timing synchronization pulses, respective encoded information, and/or respective error correction information via the optical cable to a receiver component of another transceiver component. A CMC, at the receiver end, can analyze the respective light signals received via the optical cable. Based at least in part on the results of analyzing the respective light signals, the CMC can determine an error associated with the transmission of the respective light signals via the optical cable and respective characteristics of the respective light signals, including, for example, respective arrival times of the respective timing synchronization pulses, respective light intensity or power levels of the respective light signals, and/or other respective characteristics. Based at least in part on the respective characteristics of the respective light signals, the CMC can determine a compensation action to perform mitigate the error with regard to subsequent transmissions of light signals. The compensation action can comprise, for example, suspending one or more frequencies from encoding during a subsequent transmission of light signals via the optical cable, initiate a replacement, repair, or maintenance of a portion of the optical cable, adjust a transmission rate of the subsequent transmission of light signals, and/or adjust a route of the subsequent transmission of light signals.

These and other aspects and embodiments of the disclosed subject matter will now be described with respect to the drawings.

Referring now to the drawings, FIG. 1 illustrates a block diagram of an example system 100 that can manage communication of light signals and optical cables used to communicate the light signals to mitigate error associated with using optical cables to communicate light signals, in accordance with various aspects and embodiments of the disclosed subject matter. The system 100 can comprise a transceiver component 102 that can transmit and receive light signals via one or more optical cables, including optical cable 104. The transceiver component 102 can comprise a transmitter component 106 and a receiver component (not shown in FIG. 1). The system 100 also can comprise another transceiver component 108 that can transmit and receive light signals via the one or more optical cables, including optical cable 104, wherein, in some instances, the transceiver component 108 can receive light signals from the transceiver component 102. The transceiver component 108 can comprise a receiver component 110 and a transmitter component (not shown in FIG. 1).

The transmitter component 106 can comprise a light source component 112 (LIGHT SOURCE COMP.) that can generate and emit light signals having desired wavelengths. The light source component 112 can be or can comprise, for example, a light emitting diode light (LED) source, a chemical light source, a halogen light source, a xenon light source, a metal halide light source, and/or a laser light source.

When light signals are communicated via optical cables, such as optical cable 104, the received light signals at the receiver component 110 can have some error due to damage to a portion of the optical cable, imperfections in the optical cable, or other issues that can degrade the performance of the optical cable and impact (e.g., negatively impact) the communication of data in light signals via the optical cable. For instance, the optical cable (e.g., 104) can be subject to significant movement or vibrations (e.g., macro bends or micro bends) due to winds and/or other forces, interactions with animals, wear and tear, and/or other interactions that can cause damage to the optical cable, or portion thereof, and/or can otherwise degrade the performance of the optical cable. Further, optical cables (e.g., fiber optic cables) that are optimized or utilized for mobile and mechanically active stationary environments often can suffer performance degradation from various qualitative challenges related to dispersion.

There can be a number of fundamental issues or challenges relating to optical communications via optical cables. For instance, one challenge can be measurement and compensation for degraded or damaged optical cables, wherein the capacity of an optical cable can degrade over time (e.g., due to wear and tear, vibration and other environmental conditions, . . . ) or precipitously due to a fault event (e.g., an object, an animal, or a weather event damages the optical cable). Another challenge can be that high-capacity optical fiber transmission systems can be in a constant or substantially constant state of motion, which can cause variability in the transmission performance of the fiber optic cable. Still another challenge can involve dispersion within the fiber in various modes. Also, when employing twisted light technology in order to enhance the bandwidth of an optical fiber transmission system, the sensitivity of fiber optic cables to motion, faults, and degradation can be magnified relative to traditional linear modulation systems. The use of twisted light in high capacity transmission systems, while providing capacity improvement over traditional linear modulation systems, also can demand more precise management of the optical fiber's characteristics in order to maintain a desirable (e.g., optimized, enhanced, or suitable) level of performance.

With regard to quality of service (QoS), in the concept of optical fiber communication networks, the concept of QoS can encompass a set of key performance indicators (KPIs) that can provide a means of quantitative analysis on a particular system and can provide a mechanism of comparison between like systems. KPIs for an optical fiber communication network can include, for example: optical attenuation, which can be the loss of energy by a light pulse as it travels through the optical cable; signal loss, which, in the optical case, data (e.g., loss of a data packet) can be lost, for example, due to the light signal being absorbed by impurities or damage to the optical cable (e.g., cladding) itself, wherein such data loss can be akin to packet loss in an electrical or wireless communication medium; latency, which can increase due to error correction schemes (e.g., packet forwarding, checksums, . . . ) and transitions from different types of entry points, wherein, for example, routing, modulation, amplification, and dispersion correction modules (DCMs) can all contribute to higher latency (e.g., longer travel times of light signals during transmission via an optical cable); and bandwidth (e.g., throughput), which can be thought of as the average rate of data flow, wherein bandwidth can be directly proportional to frequency in the optical transmission case, which accordingly can set a maximal throughput value, and wherein bandwidth can be degraded by a number of, and a confluence of, factors, including the factors described herein.

The disclosed subject matter can overcome the aforementioned issues (e.g., degraded or damaged optical cables undesirably impacting communication of data, particular issues relating to using twisted light to communicate data via optical cables, dispersion issues, . . . ) and other issues relating to transmitting data using light signals communicated via optical cables. The disclosed subject matter can efficiently mitigate (e.g., reduce, minimize, or eliminate) errors associated with communicating light signals (e.g., light signals comprising data), and associated data, via optical cables. The disclosed subject matter also can increase the throughput over the fiber optic channel (e.g., optical cable 104), can enhance QoS for optical communication of data, and can increase the performance and efficiency of the optical communication network of the system 100 overall.

In accordance with various embodiments, the system 100 can comprise a communication management component (CMC) 114, which can comprise a synchronization component 116, at the transmission side, and a CMC 118 at the receiving side that can employ techniques and methods that can efficiently and effectively measure and compensate for the impact of degraded or damaged optical cables (e.g., fiber optic cables of a fiber optic-based data transmission system), in part, by comparing optical carriers of two of more wavelengths that can be modulated using twisted light or traditional optical carrier techniques. As more fully described herein, the CMC 114 can include timing synchronization pulses on each optical carrier (e.g., light signal) simultaneously or at different times (e.g., different times that are known), and the CMC 118 and/or CMC 114 can use the differential arrival times and distortion characteristics of each optical carrier's timing synchronization pulses to determine or characterize a desirable (e.g., suitable, useful, or optimal) error compensation action, which can be used to compensate for, correct, or mitigate error associated with transmission of optical carriers via an optical cable (e.g., optical cable 104), in a dynamic environment. The disclosed subject matter can thereby reduce instances for using dispersion compensation devices as that function of dispersion compensation devices can be incorporated into the ISO Layer 1 waveforms and compensation can leverage the mechanisms (e.g., mechanisms employed by the CMC 114 and/or CMC 118), as described herein.

The CMC 114 and/or CMC 118, by utilizing timing synchronization pulses for optical carriers of two or more wavelengths, can determine differential measurement data across two or more wavelengths, based at least in part on the respective timing synchronization pulses of the optical carriers. The CMC 114 and/or CMC 118 can use the differential measurement data (e.g., delta information) to determine a compensation action that can compensate for the variations in the individual waveforms of the optical carriers. For instance, the CMC 114 and/or CMC 118 can compensate for (e.g., can perform an automatic calibration to compensate for) error associated with transmission of optical carriers, comprising data, using (e.g., based at least in part on) cross-wavelengths time differentials derived from analysis of the optical carriers of different wavelengths and respectively associated timing synchronization pulses, as more fully described herein. In some embodiments, the CMC 114 and/or CMC 118 can apply such compensation or automatic calibration techniques to various types of light source protocols, such as, for example, light emitting diode (LED) incoherent light source protocols, in terms of, or in connection with, multimodal dispersion correction schemes, as more fully described herein.

Traditional techniques that seek to increase signal cohesion (e.g., reduce dispersion effects) can have an undesirable (e.g., negative) impact on overall performance (e.g., latency, bandwidth, . . . ) of an optical transmission system. For instance, a common technique can be to reduce the speed of faster data traffic to allow slower data traffic to catch up to the faster data traffic. In contrast to traditional techniques, the disclosed subject matter, employing the CMC 114 and/or CMC 118, can utilize natural and predictable dispersion to facilitate performing error correction and dynamic enhancement (e.g., dynamic optimization) with regard to transmission of optical carriers, comprising data, via optical cables.

Figure 2:
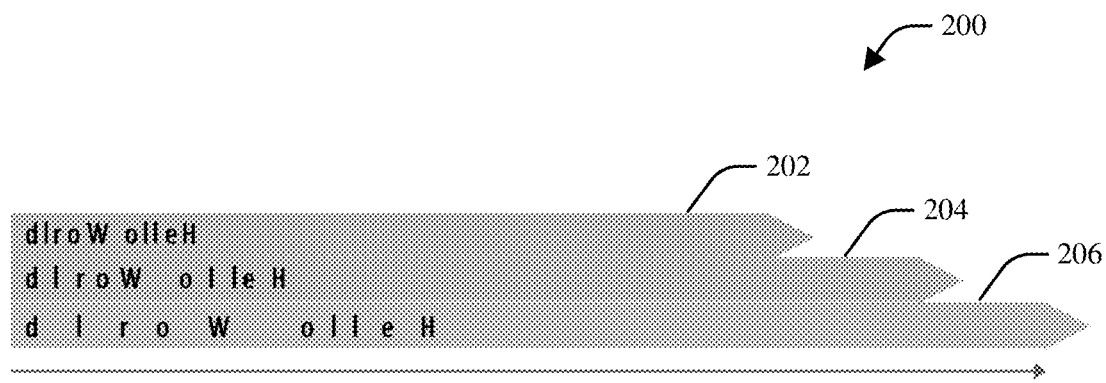
FIG. 2 depicts a diagram of an example signal transmission via a single mode fiber.
Figure 3:
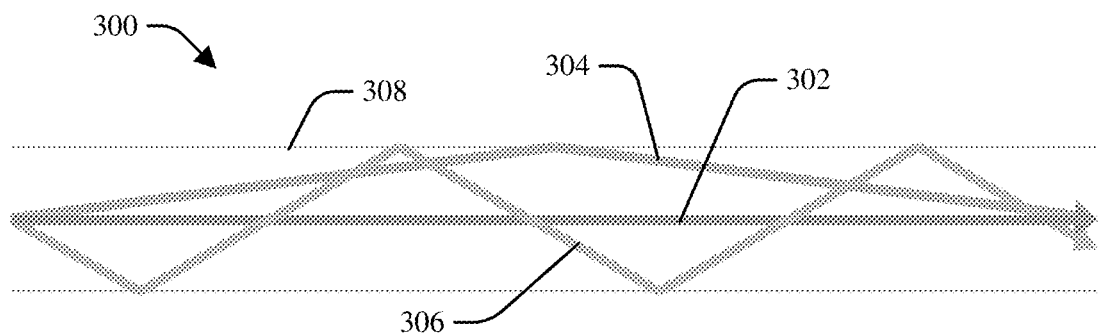
FIG. 3 presents a diagram of an example signal transmission via a multimodal optical fiber, in accordance with aspects and embodiments of the disclosed subject matter.
Figure 4:
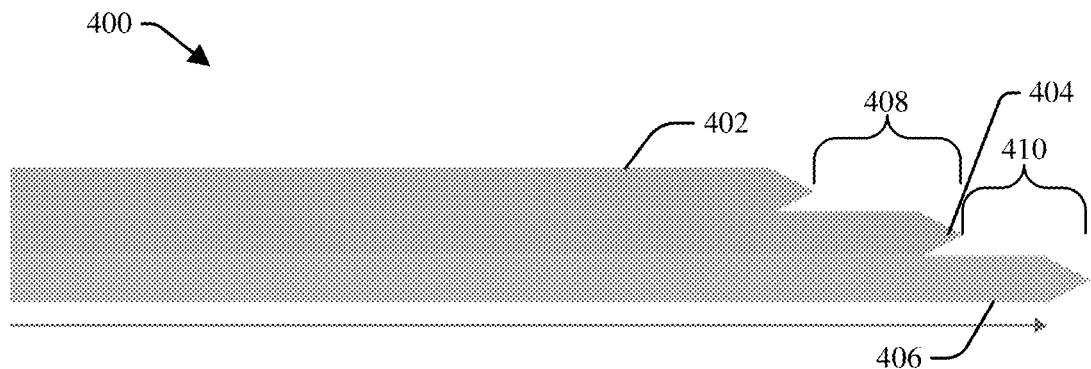
FIG. 4 depicts a diagram of an example signal transmission illustrating chromatic differentials in light signals based on the respective wavelengths of the light signals.

Referring to FIGS. 2-4 (along with FIG. 1), FIGS. 2-4 are diagrams of various types of transmissions of signals via optical cables to facilitate illustrating certain issues with regard to transmission of optical carriers as well as how the disclosed subject matter can address and overcome issues with regard to transmission of optical carriers. FIG. 2 depicts a diagram of an example signal transmission 200 via a single mode fiber. The example signal transmission 200 can comprise a single message (e.g., "Hello World") communicated via one signal that can be encoded on and carried by three frequencies, comprising the signal carried by a first frequency 202, the signal carried by a second frequency 204, and the signal carried by a third frequency 206, transmitted by one source to one destination. This can be a common technique used in a number of legacy fiber systems.

One downside of this single mode technique can be that the same data arrives at the destination at different times or the message can be spread out over time (e.g., chromatic dispersion). Chromatic dispersion can result from the spectral width, wherein the spectral width can determine the number of different wavelengths that are emitted from the LED or laser light source. For instance, the smaller the spectral width, the fewer emitted wavelengths. Generally, longer wavelengths can travel faster than shorter wavelengths (e.g., higher frequencies), and the longer wavelengths can arrive at the end of the fiber optic link ahead of the shorter wavelengths, which can spread the signal. A common technique to decrease chromatic dispersion can be to narrow the spectral width. For example, a laser can have a narrower spectral width than traditional LEDs (e.g., non-coherent light source). An upside of the single mode technique can be that the difference in arrival times or chromatic dispersion can readily be corrected by inserting by inserting a device(s) along the fiber optic path that can correct the undesired effect. Often such device can create a lag on faster signals so that all frequencies deliver their message at the same time or substantially the same time.

FIG. 3 presents a diagram of an example signal transmission 300 via a multimodal optical fiber, in accordance with aspects and embodiments of the disclosed subject matter. The example signal transmission 300 can be a representation of a somewhat more modern approach to fiber design. The example signal transmission 300 can include a first mode 302 (e.g., first path), a second mode 304, and a third mode 306 that can travel along the fiber optic link 308. In this multimodal technique, as can be observed, the respective modes 302, 304, and 306 (e.g., paths) traveling along the fiber optic link 308 can vary in length, wherein the mode 302 can be shorter in length than mode 304 and mode 306, since mode 302 is traveling straight down the center of the fiber optic link 308 instead of bouncing off of the walls of the fiber optic link 308, and mode 304 can be shorter in length than mode 306, as mode 304 travels in a relatively straighter path than mode 306. In general, the same information is still being sent at the same time, but now there can be a time lag due to the path length (e.g., modal dispersion). As indicated, modal dispersion can relate to the path or mode of each light ray. Some light rays (e.g., mode 302) can travel in a straight line, and other light rays (e.g., mode 304, mode 306) can bounce (e.g., repeatedly bounce) off of the cladding or core of the fiber optic link 308. For instance, high-order nodes can enter at sharp angles, and they can take longer to reach the end of the fiber optic link 308 and can contribute to modal dispersion.

There can be frequency-division multiplexing (FDM) approaches that can carry a number of messages over the same fiber optic link 308 at the same time. However, nonetheless, even in such schemes where messages can be segregated into different spectral channels, within these channels there often can be clusters of different modes all carrying the same message along paths of varying length (e.g., mode 302, mode 304, and/or mode 306). Multimodal techniques can be relatively effective for LED source systems, in that often these are not laser-LEDs, but rather regular LEDs that emit a non-coherent light source (e.g., light rays emerge traveling in various different directions). A disadvantage of such multimodal techniques can be that they can suffer from both chromatic and modal dispersion, which can produce time lag effects. To reconcile these time lag effects, techniques and devices can be employed to slow down faster traffic, for example, from the fiber construction itself or from external devices, to allow the slower traffic to catch up to the faster traffic, with the desired goal of delivering a coherent message to the destination device. For instance, a common technique to reduce modal dispersion can be to utilize a graded-index fiber, wherein the graded-index fiber's cladding can be doped so that the refractive index can gradually decrease over many layers. Using graded-index fiber can cause the light to travel in a more curved path, wherein the high-order nodes can spend much of the time traveling in the lower-index cladding layers near the outside of the fiber, and the lower-index core layers allow the light to travel faster than in the higher-index center layers, and, as a result, their higher velocity can compensate for the longer paths of these high-order nodes.

Another type of dispersion that can be experienced in transmission of light signals via a fiber optic link can be material dispersion. Material dispersion can be caused by the wavelength dependence on the refractive index of the fiber core material, while the waveguide dispersion can occur due to dependence of the mode propagation constant on the fiber parameters (e.g., core radius, and the difference between refractive indexes in the fiber core and fiber cladding) and signal wavelength. Material dispersion can contribute to group delay distortion, along with waveguide delay distortion, deferential mode delay, and multimode group delay spread.

FIG. 4 depicts a diagram of an example signal transmission 400 illustrating chromatic differentials in light signals based on the respective wavelengths of the light signals. There can a first light signal 402 having a first wavelength, a second light signal 404 having a first wavelength, and a third light signal 406 having a third wavelength, which can be depicted as traveling in a straight line. As can be observed, there can be a first time differential 408 between the first light signal 402 and the second light signal 404 that can be based at least in part on the difference between the first wavelength of the first light signal 402 and the second wavelength of the second light signal 404. There also can be a second time differential 410 between the second light signal 404 and the third light signal 406 that can be based at least in part on the difference between the second wavelength of the second light signal 404 and the third wavelength of the third light signal 406.

Referring again briefly to FIG. 3, the example signal transmission 300 also can illustrate a multimodal differential between light signals of different wavelengths. For instance, the first mode 302, which can be a first light signal having a first wavelength, can travel a first path along the fiber optic link 308 that can be 1 distance unit in length. The second mode 304, which can be a second light signal having a second wavelength, can travel a second path along the fiber optic link 308 that can be 1.5 distance units in length. The third mode 306, which can be a third light signal having a third wavelength, can travel a third path along the fiber optic link 308 that can be 4 distance units in length.

As disclosed, some traditional techniques can employ dispersion compensation devices to attempt to compensate for undesired dispersion effects in optical transmissions via a fiber optic link. Dispersion compensation devices can include, for example, dispersion compensation devices that can be fiber optic in nature and/or can be for multimodal fiber. Dispersion compensation devices that can be fiber optic in nature can have certain undesirable qualities, including that they can have an undesirably high insertion loss. Dispersion compensation devices, tools, or techniques for multimodal fiber also can have some undesirable qualities, including that they can be undesirably limited to one or more of the following restrictions: an undesirably limited operational bandwidth, an undesirably limited total dispersion, an undesirably low peak power handling, and/or an undesirably large special footprint.

With further regard to FIG. 1, various aspects of the disclosed subject matter will be described or further described. In some embodiments, the CMC 114 can embed timing synchronization pulses in desired places (e.g., time locations) in light signals (e.g., optical carriers) of respective wavelengths to facilitate determining error (e.g., an amount of error, a type(s) of error) in transmission of light signals via the optical cable 104. The CMC 114 can comprise a synchronization component 116 (SYNCH. COMP.) that can generate the timing synchronization pulses and embed or encode respective timing synchronization pulses in respective light signals having respective wavelengths. For instance, with regard to two (or more) light signals being processed for transmission via the optical cable 104, the synchronization component 116 can embed a first timing synchronization pulse in a first location (e.g., first time location) in a first light signal having a first wavelength and a second timing synchronization pulse in a second location (e.g., second time location) in a second light signal having a second wavelength. In some embodiments, the second location in the second light signal can be the same as (e.g., the same time instance as) the first location in the first light signal, such that the transmitter component 106 can transmit the first timing synchronization pulse with the first signal simultaneously with the transmitting of the second timing synchronization pulse with the second signal. In other embodiments, the second location in the second light signal can be different from (e.g., a different time instance from) the first location in the first light signal such that the transmitter component 106 can transmit the first timing synchronization pulse with the first signal at a different time than the transmitting of the second timing synchronization pulse with the second signal, wherein a CMC 118 of the receiver component 110 can know the first and second locations of the first and second timing synchronization pulses in the first and second signals. In certain embodiments, the synchronization component 116 can generate and embed, or facilitate embedding, timing synchronization pulses in light signals randomly or pseudo-randomly, in accordance with a defined timing synchronization pulse algorithm, to facilitate enhanced security of the light signals.

Figure 5:
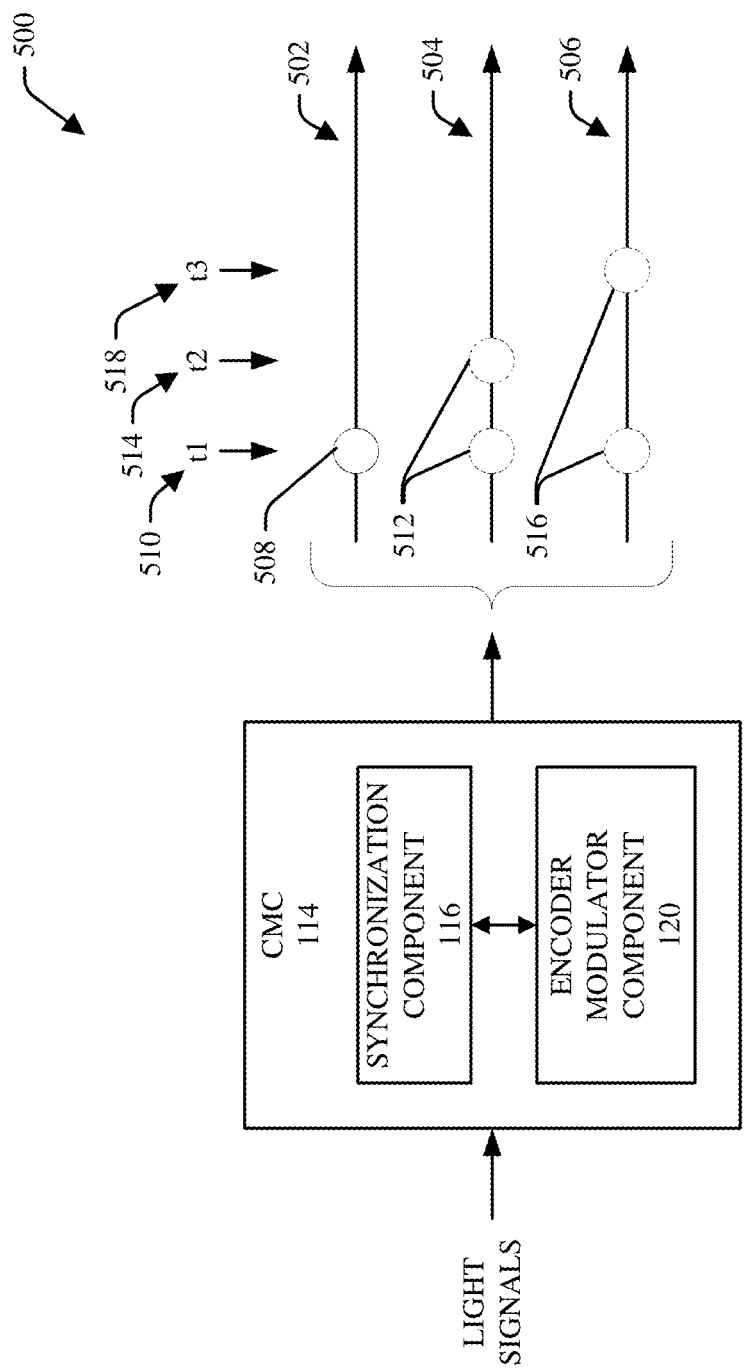
FIG. 5 depicts a block diagram of an example system that embed or encode respective timing synchronization pulses in respective light signals having respective wavelengths to facilitate managing communication of light signals and optical cables used to communicate the light signals to mitigate error associated with using optical cables to communicate light signals, in accordance with various aspects and embodiments of the disclosed subject matter.

Referring to FIG. 5 (along with FIG. 1), FIG. 5 depicts a block diagram of an example system 500 that embed or encode respective timing synchronization pulses in respective light signals having respective wavelengths to facilitate managing communication of light signals and optical cables used to communicate the light signals to mitigate error associated with using optical cables to communicate light signals, in accordance with various aspects and embodiments of the disclosed subject matter. The system 500 can comprise the CMC 114, which can include the synchronization component 116 and an encoder modulator component 120 (ENC. MOD. COMP.).

The CMC 114 can process light signals received from a light source component 112 (not shown in FIG. 5). For instance, the CMC 114 can process light signals, comprising a first light signal 502 having a first wavelength, a second light signal 504 having a second wavelength, and/or third light signal 506 having a third wavelength. It is to be appreciated and understood that, while three light signals are described herein with regard to FIG. 5, in other embodiments, the disclosed subject matter can involve the CMC 114 processing more or less than three light signals, as desired.

The synchronization component 116 can generate a first timing synchronization pulse 508. The synchronization component 116 or encoder modulator component 120 can embed or encode the first timing synchronization pulse 508 in the first light signal 502, wherein the first timing synchronization pulse 508 can be associated with a first time 510 (t1) (e.g., first time instance), which can be a first transmission time or other first time associated with the first light signal 502.

The synchronization component 116 also can generate a second timing synchronization pulse 512. The synchronization component 116 or encoder modulator component 120 can embed or encode the second timing synchronization pulse 512 in the second light signal 504, wherein, in some embodiments, the second timing synchronization pulse 512 can be associated with the first time 510, or, in other embodiments, the second timing synchronization pulse 512 can be associated with a second time 514 (t2) (e.g., second time instance), wherein the second time 514 can be a second transmission time or other second time associated with the second light signal 504.

In some embodiments, the synchronization component 116 can generate a third timing synchronization pulse 516. The synchronization component 116 or encoder modulator component 120 can embed or encode the third timing synchronization pulse 516 in the third light signal 506, wherein, in some embodiments, the third timing synchronization pulse 516 can be associated with the first time 510, or, in other embodiments, the third timing synchronization pulse 516 can be associated with a third time 518 (t3) (e.g., third time instance), wherein the third time 518 can be a third transmission time or other third time associated with the third light signal 506.

When the first timing synchronization pulse 508 in the first light signal 502, second timing synchronization pulse 512 in the second light signal 504, and third timing synchronization pulse 516 in the third light signal 506 are all at the same time, the first time 510, the CMC 118 at the receiver component 110 (not shown in FIG. 5) can analyze and compare the first light signal 502 and associated first timing synchronization pulse 508, second light signal 504 and associated second timing synchronization pulse 512, and third light signal 506 and associated third timing synchronization pulse 516, with the knowledge that the first timing synchronization pulse 508, second timing synchronization pulse 512, and third timing synchronization pulse 516 are all associated with the same time, the first time 510.

In other embodiments, when the first timing synchronization pulse 508 in the first light signal 502, second timing synchronization pulse 512 in the second light signal 504, and third timing synchronization pulse 516 in the third light signal 506 are at different times, the first time 510 for the first timing synchronization pulse 508, the second time 514 for the second timing synchronization pulse 512, and the third time 518 for the third timing synchronization pulse 516, the CMC 118 at the receiver component 110 (not shown in FIG. 5) can analyze and compare the first light signal 502 and associated first timing synchronization pulse 508, second light signal 504 and associated second timing synchronization pulse 512, and third light signal 506 and associated third timing synchronization pulse 516, with the knowledge that the first timing synchronization pulse 508, second timing synchronization pulse 512, and third timing synchronization pulse 516 are all at the same time, the first time 510. That is, the CMC 118 can have knowledge beforehand (or based on information contained in one or more of the light signals 502, 504, or 506) that the respective timing synchronization pulses (e.g., 508, 512, 516) are associated with different time instances (e.g., first time 510, second time 514, third time 518). The CMC 118 can perform the analysis on the respective light signals (e.g., 502, 504, 506) and the associated timing synchronization pulses (e.g., 508, 512, 516) based at least in part on such knowledge regarding the different time instances associated with the respective timing synchronization pulses (e.g., 508, 512, 516).

For instance, when employing different time instances (e.g., first time 510, second time 514, third time 518) for the timing synchronization pulses (e.g., 508, 512, 516), the CMC 114 can determine or generate the respective time instances (e.g., first time 510, second time 514, third time 518) based at least in part on a defined timing synchronization algorithm. In some embodiments, the defined timing synchronization algorithm, and/or a random number generator component (not shown in FIG. 5) of the synchronization component 116, can be utilized to generate random or pseudo-random numbers that can be utilized as, or can be utilized to determine, the different time instances (e.g., first time 510, second time 514, third time 518) for the timing synchronization pulses (e.g., 508, 512, 516). The CMC 118 at the receiver component 110 can employ the same defined timing synchronization algorithm, and/or a same type of random number generator component, to generate corresponding (e.g., same) random or pseudo-random numbers that can be utilized as, or can be utilized to determine, the different time instances (e.g., first time 510, second time 514, third time 518) for the timing synchronization pulses (e.g., 508, 512, 516) received by the receiver component 110 with the light signals (e.g., 502, 504, 506).

In certain embodiments, the CMC 114 can generate the respective timing synchronization pulses (e.g., 508, 512, 516) to have or comprise respective timing synchronization pulse values that can be based at least in part on the respective time instances (e.g., first time 510, second time 514, third time 518), in accordance with the defined timing synchronization algorithm. Thus, a first timing synchronization pulse value of the first timing synchronization pulse 508 can indicate the first time 510 associated with the first timing synchronization pulse 508, a second timing synchronization pulse value of the second timing synchronization pulse 512 can indicate the second time 514 associated with the second timing synchronization pulse 512, and a third timing synchronization pulse value of the third timing synchronization pulse 516 can indicate the third time 518 associated with the third timing synchronization pulse 516. The CMC 118 at the receiver component 110 can determine the respective time instances (e.g., first time 510, second time 514, third time 518) of the respective timing synchronization pulses (e.g., 508, 512, 516) based at least in part on the results of analyzing the respective (e.g., first, second, third) timing synchronization pulse values of the respective timing synchronization pulses (e.g., 508, 512, 516), in accordance with the defined timing synchronization algorithm.

With further regard to FIG. 1, in some embodiments, the CMC 114 can squeeze light signals to generate squeezed light signals that can have a reduced quantum uncertainty and reduced amplified spontaneous emission (ASE), as compared to the original light signals. Squeezed light can involve the removal of relatively small quantum fluctuations, which can be called noise, in waves of light. Ordinarily, light can have equal uncertainty in phase and amplitude in its coherent state. When the light is squeezed, the uncertainty in phase and amplitude is no longer equally divided. The resulting squeezed light signal can have a reduced quantum uncertainty. Squeezed light states can be used, for example, to produce one-sided device-independent quantum key distribution. With regard to ASE, light signals can have a certain amount of ASE, which can be light produced by spontaneous emission, wherein ASE often can be produced or amplified by optical or fiber amplifiers (not shown in FIG. 1) associated with the optical circuit (e.g., associated with the optical cable 104), which thereby can increase undesired noise in the optical circuit. In certain embodiments, the CMC 114 can process a light signal via optical interference to generate a processed light signal (e.g., a squeezed light signal) that can have reduced quantum uncertainty and reduced ASE, as compared to the original light signal, as more fully described herein.

In accordance with various embodiments, additionally or alternatively, the CMC 114 can twist light signals (e.g., lights signals or squeezed light signals) to generate twisted light signals. For instance, the CMC 114 can manipulate quantum spins of respective photons of a light signal to generate a twisted light signal comprising twisted photons, wherein each photon can have a desired number of twists (e.g., 1, 2, 3, ..., 8, 16, 32, ..., 1024, ..., or 65,535 twists, or other desired number of twists greater than or less than 65,535 twists). The higher the number of twists of a photon, the more bits of data that can be encoded in the photon (e.g., 10 bits of data can be encoded on a twisted photon having 1023 twists; 15 bits of data can be encoded on a twisted photon having 65,535 twists), and thus, the more bits of data that can be transmitted by the twisted light signal, as compared to an ordinary light signal where only one bit of data can be encoded per photon. When the photons are entangled, the CMC 114 can encode the entangled pair of photons with, or assign the entangled pair of photons, identification (e.g., address or serial) numbers (e.g., number 1000000000 for 512 twists, and number 1000000001 for 513 twists) to facilitate identifying the respective twists, and accordingly, respective locations of bits of data encoded on the twisted photons, as more fully described herein.

As disclosed, the CMC 114 also can comprise the encoder modulator component 120, which can receive data in the form of electrical signals (e.g., digital data in the formal of electrical signals) and can convert and/or encode such data in the form of electrical signals into light signals (e.g., ordinary light signals or twisted light signals) that can represent the data in optical form. The encoder modulator component 120 also can encode or incorporate the timing synchronization pulse in the light signal. In some embodiments, the encoder modulator component 120 can generate error correction information (e.g., forward error correction (FEC) data) that can be incorporated into or appended to the data encoded in the light signals.

At a desired time, the transmitter component 106 can transmit respective light signals (e.g., encoded light signals) having respective wavelengths and comprising respective timing synchronization pulses through the optical cable 104 to the receiver component 110 of the other transceiver component 108. The receiver component 110 can receive the respective light signals from the optical cable 104. The CMC 118 can comprise a detector component 122 (DETECT COMP.) that can detect the light signals (e.g., optical signals) received from the optical cable 104. The CMC 118 also can include a decoder demodulator component 124 (DEC. DEMOD. COMP.) that can decode and/or demodulate the light signals to convert the light signals to electrical signals (e.g., digital signals) and recover the respective data, respective timing synchronization pulses, and/or respective error correction information encoded in, embedded in, or associated with the light signals.

The CMC 118 further can include a characteristics identifier component 126 (CHAR. ID COMP.) that can identify or determine characteristics of light signals, and/or characteristics of the optical cable (e.g., 104) utilized to transmit the light signals, based at least in part on an analysis of the light signals, including the respective timing synchronization pulses of the light signals. For example, with regard to a first light signal and second light signal, the CMC 118 can analyze the first and second light signals. Based at least in part on the results of the analysis, the CMC 118 can determine a first group of characteristics associated with the first signal, including determining the first time of arrival of the first timing synchronization pulse of the first light signal, the first wavelength of the first light signal, the first light intensity level of the first signal, the first power level of the first signal, and/or other characteristics associated with the first light signal. Also, based at least in part on the results of the analysis, the CMC 118 can determine a second group of characteristics associated with the second signal, including determining the second time of arrival of the second timing synchronization pulse of the second light signal, the second wavelength of the second light signal, the second light intensity level of the first signal, the second power level of the first signal, and/or other characteristics associated with the second light signal. The CMC 118 also can determine or know the first expected time of arrival of the first timing synchronization pulse and the second expected time of arrival of the second timing synchronization pulse.

The CMC 118 can determine an error (e.g., an amount of error and/or a type(s) of error) associated with the transmission of the first and second light signals via the optical cable 104 based at least in part on an analysis (e.g., comparison)

of the first group of characteristics associated with the first signal and the second group of characteristics associated with the second light signal. In some embodiments, based at least in part on the results of the analysis of the first group of characteristics and the second group of characteristics, the CMC 118 can determine a third group of characteristics associated with the optical cable 104, wherein the third group of characteristics can characterize the conditions (e.g., structural and/or operating conditions) of the optical cable 104, performance of the optical cable 104 (e.g., respective performance of the optical cable 104 in transmitting respective light signals of different wavelengths), and/or other features of the optical cable 104.

For instance, the CMC 118 can determine or infer characteristics of the QoS, the optical cable 104, and/or the respective light signals based at least in part on identified deviations in comparative estimated times of arrival for respective (e.g., different) light frequencies (and corresponding wavelengths) over a same path of the optical cable 104. The CMC 118 also can compare expected relative intensities of each frequency type for the respective light signals of respective wavelengths, and can determine or infer characteristics of the QoS, the optical cable 104, and/or the respective light signals based at least in part on differences in the intensities of each frequency type, as determined by the CMC 118. For instance, different modes and frequencies can degrade (e.g., lose power, measured in decibels) at different rates, and the CMC 118 can know this (e.g., can have information regarding such degradation) and can take this into account when comparing the relative intensities of each frequency type for the respective light signals, and determining or inferring characteristics of the QoS, the optical cable 104, and/or the respective light signals. The CMC 118 can determine and infer such information (e.g., characteristics of the QoS, the optical cable 104, and/or the respective light signals) and other information regarding the respective qualities of the light signals in real time or substantially in real time, without having to perform undesirably (e.g., excessively) time-consuming computations.

For example, the degrading of cladding in the optical cable 104 can cause a blockage, splintering, or other type of discrepancy relative to existing deltas with regard to transmission of light signals via the optical cable 104. Based at least in part on the results of analyzing the received light signals of respective wavelengths and having respective timing synchronization pulses, the CMC 118 can determine such degrading of the cladding in the optical cable 104. Since the understanding of the CMC 118 and/or CMC 114 can be based at least in part on the current function of a certain portion of the path (e.g., fiber path) of the optical cable 104, the CMC 118 and/or CMC 114 can have a view into the real-time performance of the optical cable 104 (e.g., the data link). In contrast to traditional systems and techniques, which can be based on theoretical projections of assumed characteristics, the disclosed subject matter can enable the CMC 114 and/or CMC 118 to desirably understand and adapt to (e.g., determine and implement a compensation action to adapt to) the ever changing physical environment of the system 100, including the optical cable 104.

As a further example, the CMC 118 can compare the difference between the first time of arrival and the first expected time of arrival of the first timing synchronization pulse to determine whether there is a significant amount of difference between the first time of arrival and the first expected time of arrival of the first timing synchronization pulse, which can indicate that the optical cable 104 has certain damage or degradation that is causing an error and/or substandard performance of the optical cable 104 in transmitting light signals that have the first wavelength. The CMC 118 can similarly compare the difference between the second time of arrival and the second expected time of arrival of the second timing synchronization pulse to determine whether the optical cable 104 has certain damage or degradation that is causing error and/or substandard performance of the optical cable 104 in transmitting light signals that have the second wavelength.

As another example, the CMC 118 can compare the first time of arrival of the first timing synchronization pulse with the second time of arrival of the second timing synchronization pulse, taking into account the respective first wavelength and second wavelength of the first and second light signals, to determine whether there is an error in the transmission of the first light signal and/or second light signal, and/or determine whether the optical cable 104 has some damage or degradation that is causing error and/or substandard performance of the optical cable 104 in transmitting light signals that have the first wavelength and/or the second wavelength.

As still another example, the CMC 118 can compare the first intensity level or first power level associated with the first light signal to an expected first intensity level or expected first power level for the first light signal, and/or can compare the first intensity level or first power level to the second intensity level or second power level associated with the second light signal, taking into account the respective first wavelength and second wavelength of the first and second light signals. Based at least in part on the results of such comparison, the CMC 118 can determine whether there is an error in the transmission of the first light signal and/or second light signal, and/or can determine whether the optical cable 104 has some damage or degradation that is causing such error and/or substandard performance of the optical cable 104 in transmitting light signals that have the first wavelength and/or the second wavelength. For instance, if the CMC 118 determines that the first intensity level is significantly lower than the expected first intensity level, or the difference between the first intensity level and the second intensity level is significantly different from or more than what is expected, the CMC 118 can determine that there is an error associated with the transmission of the first and second light signals, and can determine that damage or degradation of the optical cable 104 is causing such error and/or substandard performance of the optical cable 104 in transmitting light signals that have the first wavelength and/or the second wavelength.

Based at least in part on, and in response to, determining the error in the transmission of the first and second light signals via the optical cable 104, and based at least in part on the results of the analysis of the first group of characteristics, second group of characteristics, and/or third group of characteristics, the CMC 118 (or the CMC 114) can determine and manage implementation (e.g., execution) of a compensation action that can be performed to mitigate (e.g., reduce, minimize, avoid, or eliminate, . . . ) the error with regard to subsequent transmissions of light signals, which can include transmission of light signals via the optical cable 104. For instance, the CMC 118 (or the CMC 114) can determine a compensation action that can comprise suspending at least one frequency or wavelength from encoding during a subsequent transmission of light signals via the optical cable 104, initiating a replacement of all or a portion of the optical cable 104, initiating repair of or maintenance on a portion of the optical cable 104, adjusting a transmission rate of a subsequent transmission of light signals (e.g., via the optical cable 104), and/or adjusting a route of the subsequent transmission of light signals.

For example, if, based at least in part on the error and analysis results, the CMC 118 (or the CMC 114) determines that the error is resulting at least in part from the optical cable 104 not transmitting the first light signal having the first wavelength as fast as it should, which can be due in part to degradation of the optical cable 104 negatively affecting lights signals having the first wavelength, the CMC 118 (or the CMC 114) can determine that the first wavelength (and corresponding frequency), and/or one or more other wavelengths (and one or more corresponding frequencies) that also can be negatively affected by such degradation of the optical cable 104, are to be suspended from encoding during subsequent transmissions of light signals via the optical cable 104, wherein the CMC 118 (or the CMC 114) can determine the one or more other wavelengths based at least in part on the first wavelength. As a result, when transmitting light signals comprising data, the CMC 118 (or the CMC 114) can utilize light signals having wavelengths (and corresponding frequencies) for encoding of data other than the suspended first wavelength and/or one or more other wavelengths (and corresponding frequencies).

As another example, if, based at least in part on the error and analysis results, the CMC 118 (or the CMC 114) determines that the error is resulting at least in part from damage or degradation of a portion of the optical cable 104, the CMC 118 (or the CMC 114) can initiate an order or recommendation to replace, repair, or perform maintenance on the portion of the optical cable 104. Additionally or alternatively, the CMC 118 (or the CMC 114) can suspend transmission of light signals via that portion of the optical cable 104 and/or can adjust a route of subsequent transmissions of light signals to route the light signals via another optical cable path (e.g., via another optical cable) to avoid transmitting the light signals through that portion of the optical cable 104. Additionally or alternatively, the CMC 118 (or the CMC 114) can adjust (e.g., slow down) the transmission rate of a subsequent transmission of light signals when being transmitted in that portion, in proximity to that portion, of the optical cable 104 to account for the slower transmission speeds that can occur in that portion of the optical cable 104 due to the damage or degradation to that portion of the optical cable 104.

In accordance with various embodiments, the CMC 118 can communicate error information relating to the error, characteristics information relating to the respective characteristics of the respective light signals and/or characteristics of the optical cable 104, compensation action information relating to a compensation action(s) determined in connection with the transmission of the respective light signals, and/or other information to the CMC 114 via a feedback path (e.g., a dedication feedback path) between the CMC 118 and CMC 114, via the optical cable 104, or via another optical cable between the transceiver component 108 and transceiver component 102. The CMC 114 can utilize the error information and/or characteristics information to determine and implement a compensation action, for example, if the CMC 118 has not already determined a compensation action, and/or can utilize the compensation action information to implement the compensation action. In some embodiments, additionally or alternatively, the CMC 118 can implicitly inform the CMC 114 of the error, the respective characteristics of the respective signals, the characteristics of the optical cable 104, and/or the compensation action by adjustments the CMC 118 makes at the receiving end, based at least in part on the error, the respective characteristics of the respective signals, the characteristics of the optical cable 104, and/or the compensation action, that are detected by the CMC 114. Additionally or alternatively, the CMC 118 can implicitly inform the CMC 114 of the error, the respective characteristics of the respective signals, the characteristics of the optical cable 104, and/or the compensation action by parameter information (e.g., changes in parameters) relating to communication of light signals via the optical cable 104, wherein the CMC 118 can determine changes to the parameters based at least in part on the error, the respective characteristics of the respective signals, the characteristics of the optical cable 104, and/or the compensation action, and wherein the parameter information can be communicated to and/or detected by the CMC 114. The CMC 114 can analyze the implicit information (e.g., information relating to adjustments the CMC 118 made, parameter information relating to changes in parameters) it detects, and can determine the error, the respective characteristics of the respective signals, the characteristics of the optical cable 104, and/or the compensation action, based at least in part on the results of analyzing such implicit information.

Additionally or alternatively, the CMC 118 can communicate such information to another device or associated entity. For example, in response to determining that a section of the optical cable 104 is significantly damaged or impaired to the point that the section of the optical cable 104 is not suitable for use in communicating data, the CMC 118 can communicate such information with a request, instruction, or recommendation to repair or replace the section of the optical cable 104 to a communication device associated with an entity (e.g., a service technician or manager who is responsible for maintaining the optical cables) to initiate repair or replacement of the section of the optical cable 104.

It is to be appreciated and understood that, while CMC 114 on the transmitter side is described with regard to system 100 as comprising different components (e.g., synchronization component 116, encoder modulator component 120) than the components (e.g., detector component 122, decoder demodulator component 124, characteristics identifier component 126) of the CMC 118 on the receiver side, the disclosed subject matter is not so limited, as, in some embodiments, the CMC 114 of the transceiver component 102 and the CMC 118 of the other transceiver component 108 can comprise the same components (e.g., synchronization component 116, encoder modulator component 120, detector component 122, decoder demodulator component 124, characteristics identifier component 126, and/or other components) and can be associated with transmitter component and receiver component of the transceiver component with which the CMC is associated (e.g., in which the CMC is contained).

Figure 6:
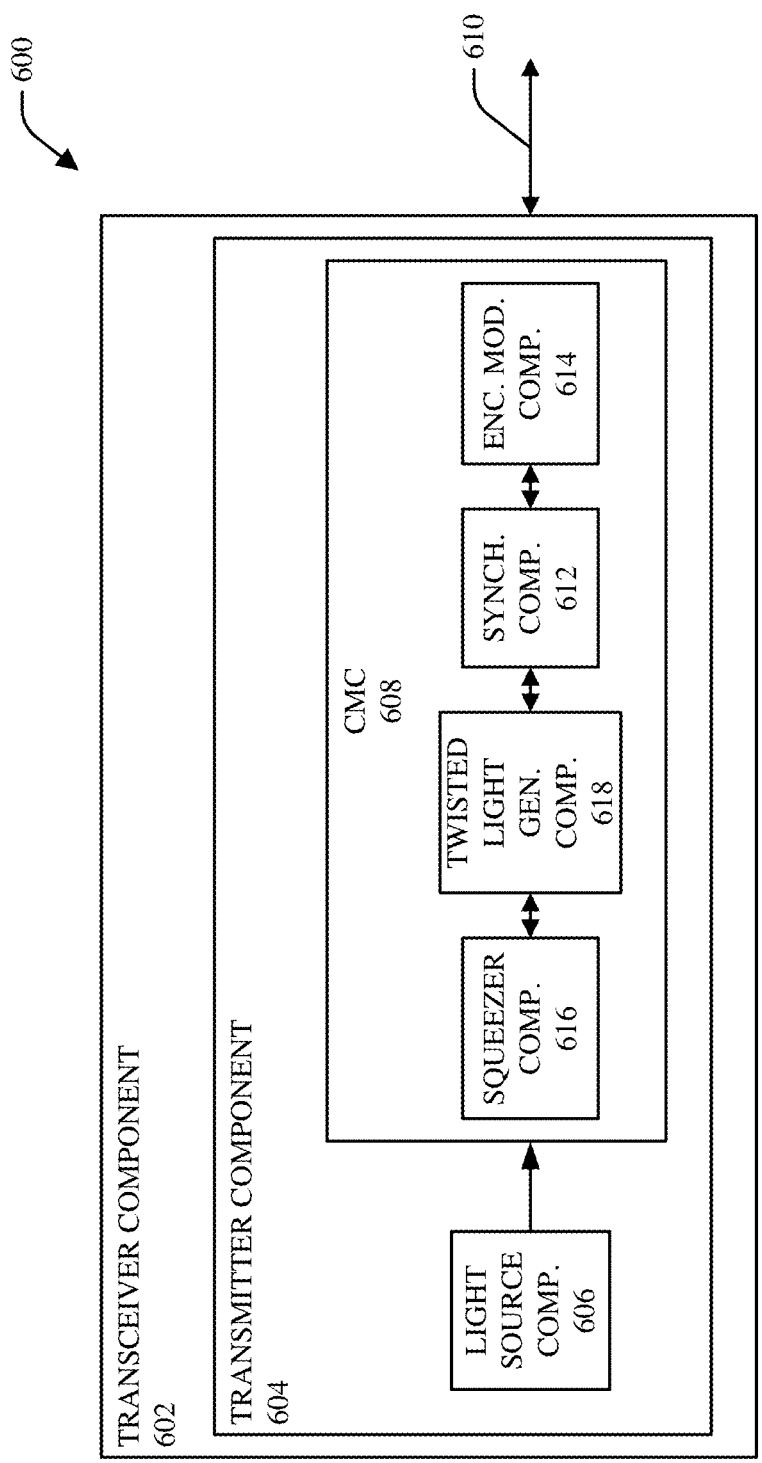
FIG. 6 illustrates a block diagram of an example system that can process light signals to squeeze and/or twist the light signals and can manage communication of such light signals and optical cables used to communicate such light signals to mitigate error associated with using optical cables to communicate light signals, in accordance with various aspects and embodiments of the disclosed subject matter.

Turning to FIG. 6, FIG. 6 illustrates a block diagram of an example system 600 that can process light signals to squeeze and/or twist the light signals and can manage communication of such light signals and optical cables used to communicate such light signals to mitigate error associated with using optical cables to communicate light signals, in accordance with various aspects and embodiments of the disclosed subject matter. The system 600 can comprise a transceiver component 602 that can transmit or receive light signals. The light signals communicated to or from the transceiver component 602 can comprise information (e.g., encoded bits of data). For instance, the transceiver component 602 can comprise a transmitter component 604 that can transmit light signals comprising information. The transmitter component 604 can include a light source component 606 that can generate light signals (e.g., optical carriers) that can be utilized to encode and transmit information. The light source component 606 can be and can function, such as more fully described herein.

The transmitter component 604 can comprise or be associated with a CMC 608 that can manage the communication of lights signals (e.g., light signals comprising information), determine errors associated with the communication of light signals via optical cables, such as optical cable 610, determine compensation actions that can be implemented to mitigate (e.g., reduce, minimize, avoid, eliminate, compensate for, . . . ) the errors associated with the communication of light signals via optical cables, implement (e.g., execute) or facilitate implementing the compensations, and/or perform other functions or operations, as more fully described herein. The CMC 608 can be associated with (e.g., connected to) the light source component 606, and can receive light signals from the light source component 606.

The CMC 608 can comprise a synchronization component 612 (SYNCH. COMP. 612) that can generate timing synchronization pulses and embed respective timing synchronization pulses in respective light signals having respective wavelengths, as more fully described herein. The CMC 608 also can include an encoder modulator component 614 (ENC. MOD. COMP. 614) that can be associated with (e.g., connected to) the synchronization component 612. The encoder modulator component 614 can receive data in the form of electrical signals and can convert and/or encode such data in the form of electrical signals into the light signals (e.g., ordinary light signals or twisted light signals), which can represent the data in optical form. The encoder modulator component 614 also can encode or incorporate timing synchronization pulses in light signals. In some embodiments, the encoder modulator component 614 can generate error correction information, which can be appended to the data encoded in the light signals.

In some embodiments, the CMC 608 can include a squeezer component 616 (SQUEEZER COMP. 616) that can squeeze light signals to generate squeezed light signals that can have a reduced quantum uncertainty and reduced ASE as compared to the original light signals. In certain embodiments, the squeezer component 616 can process a light signal via optical interference (e.g., multi-level or multi-stage optical interference) to generate a processed light signal (e.g., a squeezed light signal) that can have reduced quantum uncertainty and reduced ASE, as more fully described herein.

In certain embodiments, the disclosed subject matter also can employ twisted light to facilitate desirable (e.g., enhanced) encoding of information in light signals. The orbital angular momentum (OAM) of light is a component of angular momentum of a light signal (e.g., light beam) that can be dependent on the field spatial distribution of the light, and is not dependent on the polarization of the light. High-order OAM can be a quantum mechanical state that can be observed at the macroscopic level. One aspect of high-order OAM is optical vortices, which can be utilized for various applications, such as, for example, optical tweezing (e.g., spinning of microscopic objects), creating imaging systems, and quantum optics (e.g., optical vortices can provide certain insights into quantum optics due to the behavior of optical vortices within nonlinear materials). An optical vortex also can be referred to as twisted light or topological charge. In an optical vortex, light can be twisted like a corkscrew around its axis of travel. Due to the twisting of the light, the light waves at the axis itself can cancel each other out. As a result, when an optical vortex is projected onto a flat surface, the optical vortex can appear like a ring of light with a dark hole in the center. Such a corkscrew of light with the darkness at the center can be referred to as an optical vortex (or twisted light or topological charge).

To facilitate generating twisted light signals, the CMC 608 can comprise a twisted light generator component 618 (TWISTED LIGHT GEN. COMP. 618) that can twist photons of light signals (e.g., ordinary or unprocessed light signals, or squeezed light signals) to generate twisted light signals such that the photons of the twisted light signals can have a desired number of twists. For instance, the twisted light generator component 618 can manipulate quantum spins of respective photons of a light signal to generate a twisted light signal comprising twisted photons. The more twists of a photon, the more bits of data that can be encoded in the photon. For instance, the twisted light generator component 618 and the encoder modulator component 614 can operate in conjunction with each other to encode bits of data in high-dimensional states of the photon (e.g., twisted photon). The ability to perform such encoding can be due in part to a quantum mechanical phenomenon known as optical orbital momentum.

The photon can take on a desired number of quantum twists, wherein the quantum twists of the photon can have a physically observable effect. For instance, a beam of twisted light, comprising twisted photons, when projected on a flat, smooth surface, can reveal a shadow around its circumference (e.g., like an inverse halo) where a set of concentric rings can be observed, wherein the number of rings can be proportional to the number of twists of the photons of the twisted light. This can appear like a concentric of shadow bands that can surround the spot light. The number of twists on a photon can be counted, for example, by counting the number of rings, similar to determining the age of a tree by counting the rings in the trunk of the tree.

Figure 7:
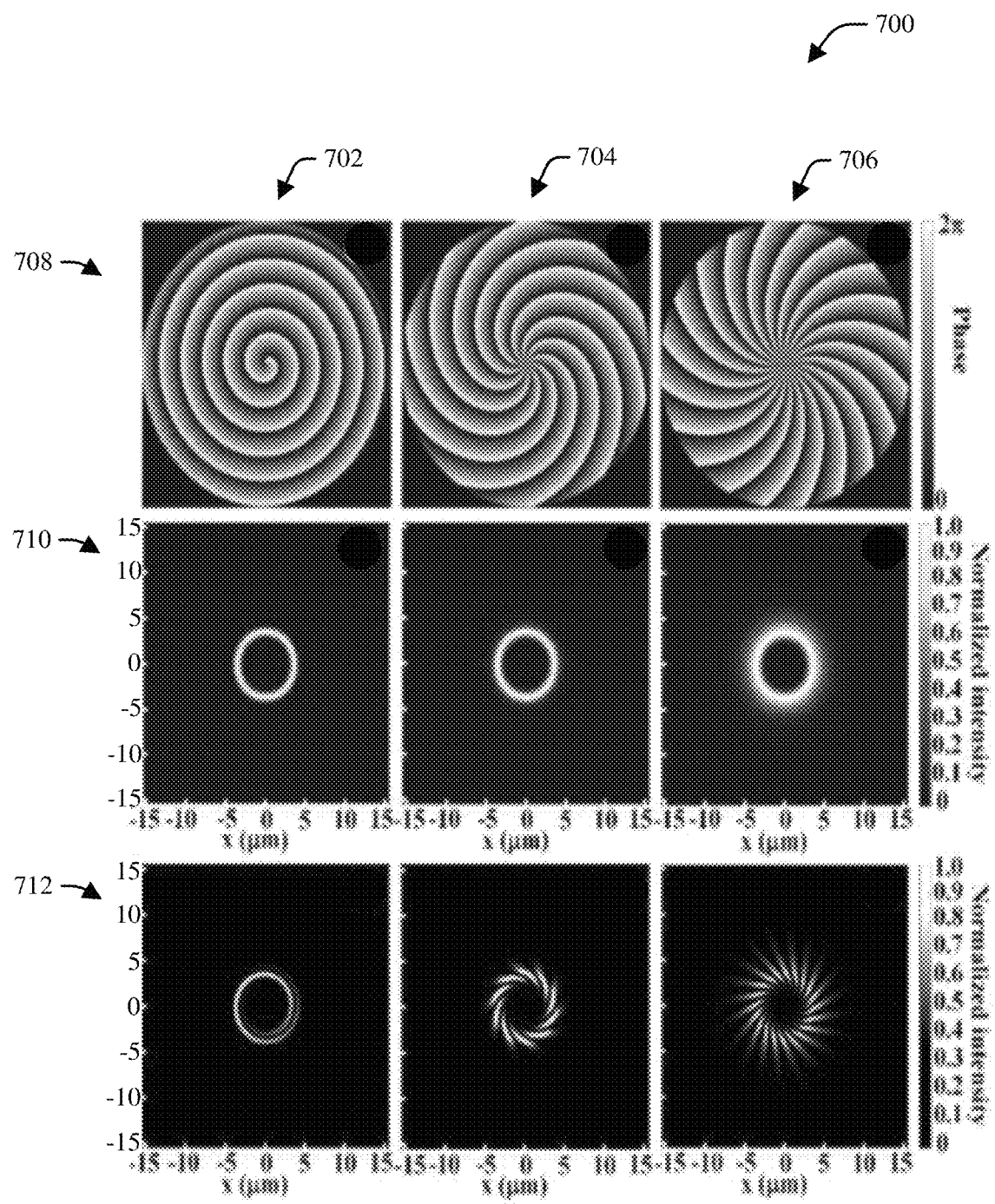
FIG. 7 presents a diagram of example twisted light images, in accordance with various aspects and embodiments of the disclosed subject matter.

Referring briefly to FIG. 7 (along with FIG. 6), FIG. 7 presents a diagram of example twisted light images 700, in accordance with various aspects and embodiments of the disclosed subject matter. The example twisted light images 700 can include a first subset of twisted light images 702 of a first twisted photon having a first number of twists, a second subset of twisted light images 704 of a second twisted photon having a second number of twists, and a third subset of twisted light images 706 of a third twisted photon having a third number of twists. The top group of twisted light images 708 presents phase information regarding the first twisted photon, second twisted photon, and third twisted photon, respectively. The middle group of twisted light images 710 presents information regarding the normalized intensity of the first twisted photon, second twisted photon, and third twisted photon, respectively. The bottom group of twisted light images 712 presents other information, visualized in the form of bright fringes, regarding the normalized intensity of the first twisted photon, second twisted photon, and third twisted photon, respectively.

As can be observed in the example twisted light images, the third twisted photon of the third subset of twisted light images 706 has a higher number of twists than the second twisted photon of the second subset of twisted light images 704, and the second twisted photon has a higher number of twists than the first twisted photon of the first subset of twisted light images 702. For instance, it can be observed that the normalized intensity of the third twisted photon is higher than the second twisted photon, and the normalized intensity of the second twisted photon is higher than the first twisted photon. In that regard, it also can be observed that the third twisted photon has a higher number of bright fringes than the second twisted photon, and the second twisted photon has a higher number of bright fringes than the first twisted photon. It is noted that, by counting the number of bright fringes, the respective topological charges of the first twisted photon, second twisted photon, and third twisted photon can be identified. As also can be observed in the respective twisted light images, particularly the middle group of twisted light images 710 and the bottom group of twisted light images 712, the respective twisted light images (e.g., the respective optical vortices) can appear like a ring of light with a dark hole in the center.

With further regard to FIG. 6, when the photons are entangled, the CMC 608 can encode the entangled pair of photons with, or assign the entangled pair of photons, identification numbers to facilitate identifying the respective twists or respective groups of twists, and accordingly, respective locations of bits of data encoded on the twisted photons, as more fully described herein. For example, the CMC 608 can encode a first entangled pair of photons with a first set of identification numbers (e.g., 0000000010 (2 twists) and 0000000011 (3 twists)), a second entangled pair of photons with a second set of identification numbers (e.g., 0000011000 (24 twists) and 0000011001 (25 twists)), and a third entangled pair of photons with a third set of identification numbers (e.g., 1000000000 (512 twists) and 1000000001 (513 twists)), etc., that can respectively identify respective photon twists. The CMC 608 can generate a mapping of photons, photons twists, entangled photon partners, and identification numbers of respective photons or photon twists, based at least in part on the encoding of the entangled pair of photons with, or assigning of the entangled pair of photons, identification numbers, to facilitate mapping photons to their respective entangled partners, identifying photon twists and photons, encoding respective bits of data into respective groups of twists (e.g., respective locations of the respective bits of data in a twisted photon), and, at the decoding end, decoding and recovering respective bits of data from respective groups of twists of an encoded twisted photon.

In some embodiments, the twisted light generator component 618 can utilize a spiral phase mirror to generate or facilitate generating twisted light signals having a desired number of twists based at least in part on light signals. In other embodiments, the twisted light generator component 618 can employ another type(s) of optical device or elements to generate or facilitate generating twisted light signals based at least in part on light signals.

For each of respective twisted light signals of respective wavelengths, the encoder modulator component 614 can receive the twisted light signal from the twisted light generator component 618, can receive data (e.g., bits of data) in the form of electrical signals (e.g., data received from a communication device of a user, a communication network device, or other type of device), and can receive a timing synchronization pulse (e.g., a timing synchronization pulse having a timing synchronization pulse value) from the synchronization component 612. The encoder modulator component 614 can convert and/or encode the data in the form of electrical signals and the timing synchronization pulse into the twisted light signal (e.g., into respective groups of photon twists of respective twisted photons of the twisted light signal) to generate an encoded twisted light signal that can represent the data and the timing synchronization pulse in optical form. In some embodiments, the encoder modulator component 614 also can generate error correction information, which can be appended to the data and the timing synchronization pulse encoded in the twisted light signal.

The transceiver component 602 can transmit the respective encoded twisted light signals, which can have respective wavelengths and respective encoded data and timing synchronization pulses, via the optical cable 610 to another device (e.g., a receiver component of another transceiver component), which can comprise its own CMC. The other device can detect the twisted light signals (e.g., using a detector component), and the CMC of the other device can decode and demodulate the received encoded twisted light signals to recover the respective data and the respective timing synchronization pulses from the respective encoded twisted light signals, analyze the respective timing synchronization pulses associated with the respective twisted light signals having respective wavelengths, determine an error associated with the transmission of the encoded twisted light signals, determine a compensation action that can be performed, perform, facilitate performing, or initiate performing the compensation action, and/or communicate information relating to the analysis results, error, and/or compensation action to the CMC 608 to enable the CMC 608 to determine the compensation action (if the other CMC did not determine the compensation action), and/or perform, facilitate performing, or initiate performing of the compensation action, as more fully described herein.

Figure 8:
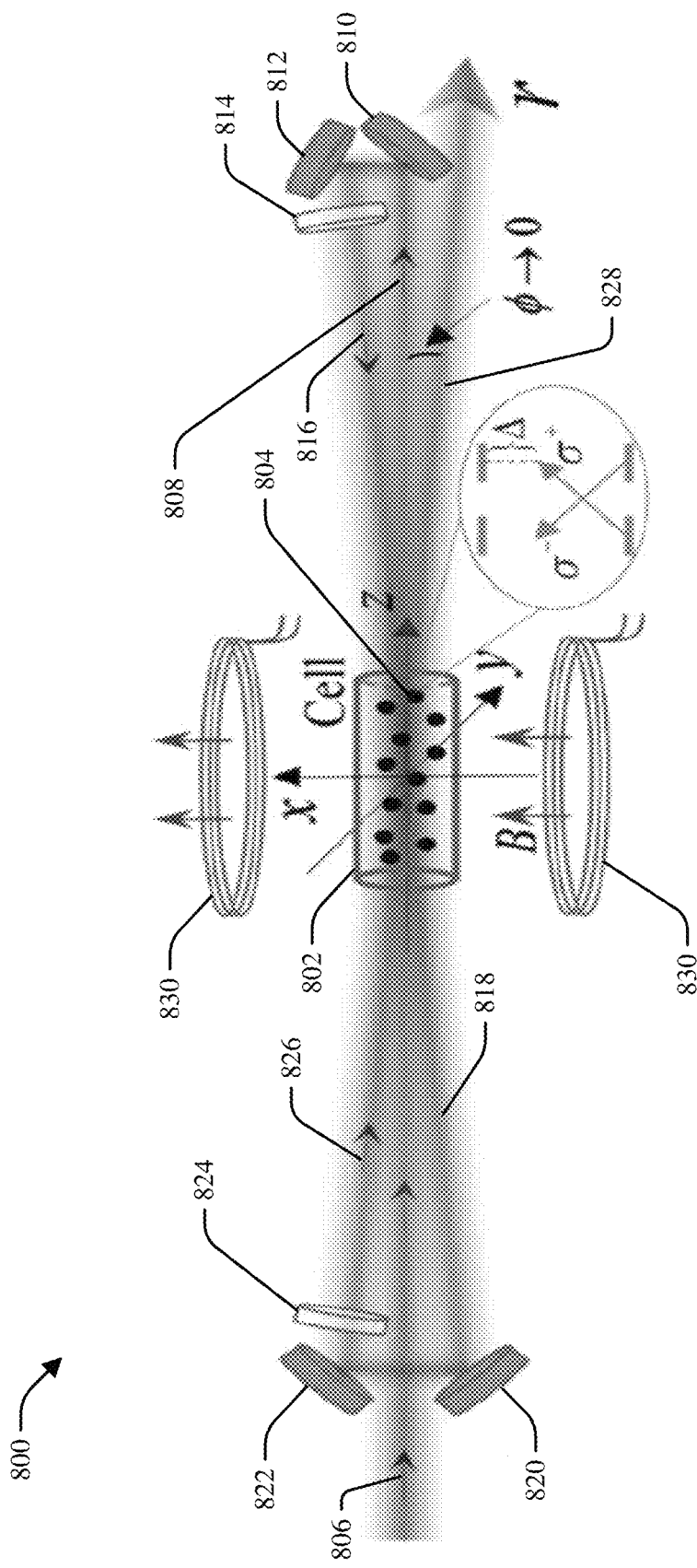
FIG. 8 presents a diagram of an example system that can squeeze or otherwise process light signals to facilitate enhanced communication of data via such light signals, in accordance with various aspects and embodiments of the disclosed subject matter.

Turning to FIG. 8, FIG. 8 presents a diagram of an example system 800 that can squeeze or otherwise process light signals to facilitate enhanced communication of data via such light signals, in accordance with various aspects and embodiments of the disclosed subject matter. In some embodiments, a squeezer component (e.g., squeezer component 616) can comprise the system 800 and can employ the system 800 to squeeze or otherwise process light signals.

The system 800 can comprise a cell component 802 that can be or can comprise a cell that can include a set of atoms, such as atom 804, wherein atoms of the set of atoms can be warm and/or cold atoms. The respective atoms (e.g., atom 804) of the set of atoms can have respective activity levels and respective paths of travel.

The system 800 can receive a light pulse 806 (e.g., light pulse of a light signal) from a light source component (not shown in FIG. 8; as more fully described herein). The light pulse 806 can be passed (e.g., transmitted) through the cell component 802 (e.g., in the z-direction). The atoms (e.g., atom 804) of the set of atoms can interact or interfere with the light pulse 806 based at least in part on the respective $\sigma^+$ and $\sigma^-$, and the associated $\Delta$ value, of the respective atoms. In some embodiments, the light pulse 806 can be a polarized coherent light signal (e.g., polarized coherent laser beam) under off-resonant Faraday interactions with the atoms (e.g., atom 804) of the cell component 802. The light pulse 806 can interact with the atoms (e.g., atom 804) to produce the first processed light pulse 808, based at least in part on the first interference (e.g., first optical interference) of the light pulse 806 resulting from the light pulse 806 interacting with the set of atoms, wherein the first processed light pulse 808 can be output from the cell component 802 (e.g., in the z-direction).

The system 800 can comprise a first reflector component 810, which can be positioned at a first reflector angle to reflect the first processed light pulse 808 off the first reflector component 810, based at least in part on the first reflector angle, such that the first processed light pulse 808 can be perpendicular or substantially perpendicular to the light pulse 806 (e.g., the first processed light pulse 808 travel in the x-direction or substantially in the x-direction) after the first processed light pulse 808 is reflected off of the first reflector component 810. It is to be appreciated and understood that, in other embodiments, as desired, the first reflector component 810 can be positioned at another desired first reflector angle that can reflect the first processed light pulse 808 at a different desired angle that is not perpendicular or substantially perpendicular to the light pulse 806.

The system 800 also can comprise a second reflector component 812 and a first waveplate component 814. The second reflector component 812 can be in proximity to the first reflector component 810. The first waveplate component 814 can be positioned or interposed between the second reflector component 812 and the cell component 802. The second reflector component 812 can be at a second reflector angle to reflect the first processed light pulse 808 off of the second reflector component 812, based at least in part on the second reflector angle, to direct the first processed light pulse 808 towards the first waveplate component 814 and the cell component 802 at a different angle (e.g., at a different angle that can be in the x-z plane) than the original light pulse 806. Such different angle between the light pulse 806 and the first processed light pulse 808 can be relatively small (e.g., less than 10 degrees).

The first processed light pulse 808 can be passed (e.g., transmitted) through the first waveplate component 814. In some embodiments, the first waveplate component 814 can be a half-wave plate. Based at least in part on the interaction of the first processed light pulse 808 with the first waveplate component 814, the polarization of the first processed light pulse 808 can be altered (e.g., modified) by the first waveplate component 814 to produce a second processed light pulse 816 that can be output from the first waveplate component 814 towards the cell component 802.

The second processed light pulse 816 output from the first waveplate component 814 can travel (e.g., can be transmitted) through the cell component 802 to produce a third processed light pulse 818, based at least in part on a second interference (e.g., second optical interference) from the second processed light pulse 816 interacting with atoms (e.g., atom 804) the set of atoms of the cell component 802. For instance, as the second processed light pulse 816 travels through the cell component 802, the second processed light pulse 816 can interact with the atoms (e.g., atom 804) of the cell component 802 to alter the second processed light pulse 816 and produce the third processed light pulse 818, based at least in part on the second interference of the second processed light pulse 816 resulting from the second processed light pulse 816 interacting with the set of atoms.

The third processed light pulse 818 can be output from the cell component 802 towards a third reflector component 820 of the system 800. The third reflector component 820 can be positioned at a third reflector angle (e.g., a third angle in the x-z plane). In some embodiments, the third processed light pulse 818 can be reflected off of the third reflector component 820 positioned at the third reflector angle such that the third processed light pulse 818 reflected off of the third reflector component 820 can be perpendicular or substantially perpendicular to the light pulse 806 (e.g., the third processed light pulse 818 can travel in the x-direction or substantially in the x-direction). It is to be appreciated and understood that, in other embodiments, as desired, the third reflector component 820 can be positioned at another desired third reflector angle that can reflect the third processed light pulse 818 at a different desired angle that is not perpendicular or substantially perpendicular to the light pulse 806.

In certain embodiments, the system 800 can comprise a fourth reflector component 822 and a second waveplate component 824. The fourth reflector component 822 can be in proximity to the third reflector component 820 and can be at a fourth reflector angle (e.g., a fourth angle in the x-z plane) to reflect the third processed light pulse 818 off of the fourth reflector component 822, based at least in part on the fourth reflector angle, to direct the third processed light pulse 818 towards the second waveplate component 824 and the cell component 802 at a different angle (e.g., at a different angle that can be in the x-z plane) than the original light pulse 806. Such different angle between the light pulse 806 and the third processed light pulse 818 can be relatively small (e.g., less than 10 degrees), and can be done, in part, for example, to enable the third reflector component 820 and fourth reflector component 822 to be respectively positioned such that they do not interfere with the initial transmission of the light pulse 806 to the cell component 802.

After the third processed light pulse 818 is reflected off of the fourth reflector component 822, the third processed light pulse 818 can pass (e.g., can be transmitted) through the second waveplate component 824, which can be positioned or interposed between the fourth reflector component 822 and the cell component 802. In some embodiments, the second waveplate component 824 can be a half-wave plate. Based at least in part on the interaction of the third processed light pulse 818 with the second waveplate component 824, the polarization of the third processed light pulse 818 can be altered by the second waveplate component 824 to produce a fourth processed light pulse 826 as an output from the second waveplate component 824.

The fourth processed light pulse 826 output from the second waveplate component 824 can be transmitted through the cell component 802. As the fourth processed light pulse travels through the cell component 802, the fourth processed light pulse 826 can interact with the atoms (e.g., atom 804) of the cell component 802 to produce a fifth processed light pulse 828, based at least in part on a third interference of the fourth processed light pulse 826 resulting from the fourth processed light pulse 826 interacting with the atoms of the cell component 802. The fifth processed light pulse 828 can be output from the cell component 802 and from the system 800 (e.g., output from the squeezer component) at a desired angle (e.g., in the x-z plane), ϕ, relative to the original light pulse 806, wherein the desired angle can be relatively small (e.g., less than 10 degrees, and close to 0 degrees in some embodiments) and can be an angle that is sufficient for the fifth processed light pulse 828 to not be interfered with by the first reflector component 810 as the fifth processed light pulse 828 (e.g., squeezed light signal) is output from the system 800 (e.g., output from the squeezer component).

The fifth processed light pulse 828 can be a desirably squeezed light pulse that can have a reduced quantum uncertainty and reduced ASE, as compared to the original light pulse 806, by employing the interference (e.g., the first interference, second interference, and third interference) of the three atom-light interactions, which can cancel entanglement between the atoms and the output light, while maintaining the effective nonlinear interaction between atoms. Such a quantum erasure on the light signal by the system 800 does not use detection or feedback, can be desirably loss tolerant, and can be performed in a desirably feasible and efficient manner by the system 800, and can be suitable to enable a desired technique for two-axis twisting (TAT) spin squeezing of light signals.

In some embodiments, to facilitate desirable activity, excitation, and/or manipulation of the atoms (e.g., 804) of the set of atoms (e.g., warm and/or cold atoms) of the cell component 802, the system 800 can include an atom manipulator component 880 that can apply a desired signal (e.g., in the x-direction), such as an electromagnetic signal or wave, to the cell component 802, and thereby to the atoms (e.g., atom 804) of the cell component 802, to activate, excite, or otherwise manipulate the atoms of the cell component 802 to facilitate or produce a desired interaction of the atoms with a particular light pulse (e.g., light pulse 806, second processed light pulse 816, or fourth processed light pulse 826), and desired interference from such interaction of the atoms with the particular light pulse, as the particular light pulse is passing through the cell component 802.

The disclosed subject matter also can be utilized to enhance optical intensity modulation direct detection (IMDD) systems. As stated, various services and applications can rely on fast, efficient, and reliable information exchange. Currently, much of this information traffic is carried over long distances by optical fiber, which can have intrinsic advantages, such as wide transmission bandwidth and low attenuation. However, continuing traffic growth can impose a number of significant challenges, including with regard to development of optical transmission systems that can handle the increasing demand for higher data rates in a financially feasible and cost effective manner.

One approach to dealing with these challenges is to scale channel capacity by employing orthogonal frequency division multiplexing (OFDM) superchannels. Unfortunately, OFDM is sensitive to synchronization errors, which can result in complete failure of the receiver-based digital signal processing. Measurement results of various OFDM synchronization methods have revealed inherent limitations with regard to relatively poor system performance, which determines the QoS level perceived by the end user, and complexity, which provides a significant indication that such OFDM synchronization methods may be unsuitable for implementation.

IMDD-type systems are optical transmission systems that also can be employed to communicate traffic. An optical transmission system can include, for example, an optical source, optical fiber, and optical detectors, along with other supporting technologies and components, such as modulators between the optical source and the detector (e.g., photodiode). In an optical transmission system, typically an incoming electrical signal (e.g., data signal, such as an IP packet stream) can be used to modulate the intensity of an optical carrier either directly using the optical source or indirectly via an external modulator. The modulated optical signal can travel along the optical fiber, wherein, at the receiver, it can be detected by the optical detector and converted back to an electrical signal.

Some IMDD systems can be somewhat limited by relatively low transmission data rate (measured in bits per second), and IMDD traditionally have been used for communication over relatively short distances. To meet increasing demand on modern communication networks, the transmission rate and reach of some IMDD systems can be improved by employing coherent OFDM (CO-OFDM) techniques. Coherent detection can be the combination of a modulated signal with a coherent signal on the receiver side. Polarization division multiplexing can involve light (e.g., electromagnetic waves) oscillating with more than one orientation. For instance, two beams of light can be launched at the same time, and if they have perpendicular orientation (orthogonal) (e.g., horizontal, x-axis and vertical, y-axis), the two beams can simultaneously travel the optical fiber without interfering with each other. Providing that the two beams have the same wavelength, polarization division multiplexing can double the data rate. Another technique that can be employed is wave division multiplexing, which is a process where different channels can be modulated onto optical carriers at different wavelengths, multiplexed, and launched into the optical fiber.

While CO-OFDM, polarization division multiplexing, and wave division multiplexing can increase data transmission rates and the reach (e.g., distance) of IMDD systems, such techniques can come at a cost of increased complexity of such systems. Additionally, performance impairments, such as, for example, fiber degradation of fiber optic cables, at relatively data transmission rates can significantly and negatively impact data transmissions, as such performance impairments can result in undesirable fiber chromatic dispersion, undesirable polarization mode dispersion, and/or ASE. Thus, optical communication networks can have a systemic dependence on ongoing performance assessment, testing, and/or troubleshooting.

When determining error in communication systems, including optical transmission systems, the bit error rate (BER) can be a significant parameter in quantifying the fidelity of data transmission. The BER can be a ratio of bits received in error to the total number of bits received. For high-speed long-haul optical transmission systems, a significant source of bit errors can be ASE noise (e.g., ASE noise resulting from optical amplification) and signal distortions that can be induced by linear and non-linear fiber impairments of the fiber optic link. An industry standard for BER can be 1e-15 BER. To meet such a BER of 1e-15 BER, forward error correction (FEC) often can be utilized. Linear dispersion typically can be due to optical dispersion, which can occur when a light pulse is spread out during fiber transmission, which can interfere with neighboring pulses, and can cause transmission errors. Non-linear impairments can increase in significance exponentially with an increase in the power launched into the fiber, which can effectively place a limit on achievable transmission reach.

Some coherent optical transmission systems can use digital signal processing (DSP) at the receiver to compensate for the fiber impairments in the fiber optic link. System performance measurements can be a significant part of ensuring that the DSP algorithms can tolerate the level of optical impairments to which the system can be exposed.

Two useful optical measurements that typically can be performed with regard to optical transmission systems can include the optical signal-to-noise ratio (OSNR) measurement and the polarization mode dispersion measurement. The OSNR can be the ratio of signal optical power to ASE noise power, and can measure the degree of impairment brought about by the ASE. The OSNR can be utilized to calibrate the level of robustness that the DSL algorithm is to have to attain the desired target BER (e.g., 1e-15 BER). The polarization mode dispersion measurement can be utilized to facilitate revealing polarization mode dispersion tolerance. Polar mode dispersion can arise because of the non-circular symmetry of actual fiber of the fiber optic link that can be brought about by, for example, external stress on the fiber optic link as well as imperfections in the fiber optic link that can be introduced during manufacturing of the fiber optic link.

There can be several forms of optical synchronization utilized in an optical transmission system. For instance, one form of optical synchronization can be frame synchronization, which can be concerned with estimating the correct start of each OFDM symbol in a received frame of a received signal. Another form of optical synchronization can be frequency synchronization, whose functionality can be compensating for the carrier frequency offset (CFO) caused by the incoherence of the light sources (e.g., lasers) at the transmitter and receiver. Still another form of optical synchronization can be sampling clock synchronization, which can be concerned with estimating and compensating for the mismatch between the sampling clocks of the digital-to-analog converter (DAC) in the transmitter and the analog-to-digital converter (ADC) in the receiver.

The disclosed subject matter can overcome the aforementioned deficiencies and other deficiencies of traditional IMDD systems. The disclosed subject matter can enhance (e.g., improve) data transmission rates, enhance the distance (e.g., feasible distance) of optical data transmissions, enhance compensating for impairments in optical cables (e.g., fiber optic cables), reduce errors in optical data transmissions, and/or reduce or more efficiently utilize resources (e.g., processing resources) in IMDD systems over traditional IMDD systems.

Figure 9:
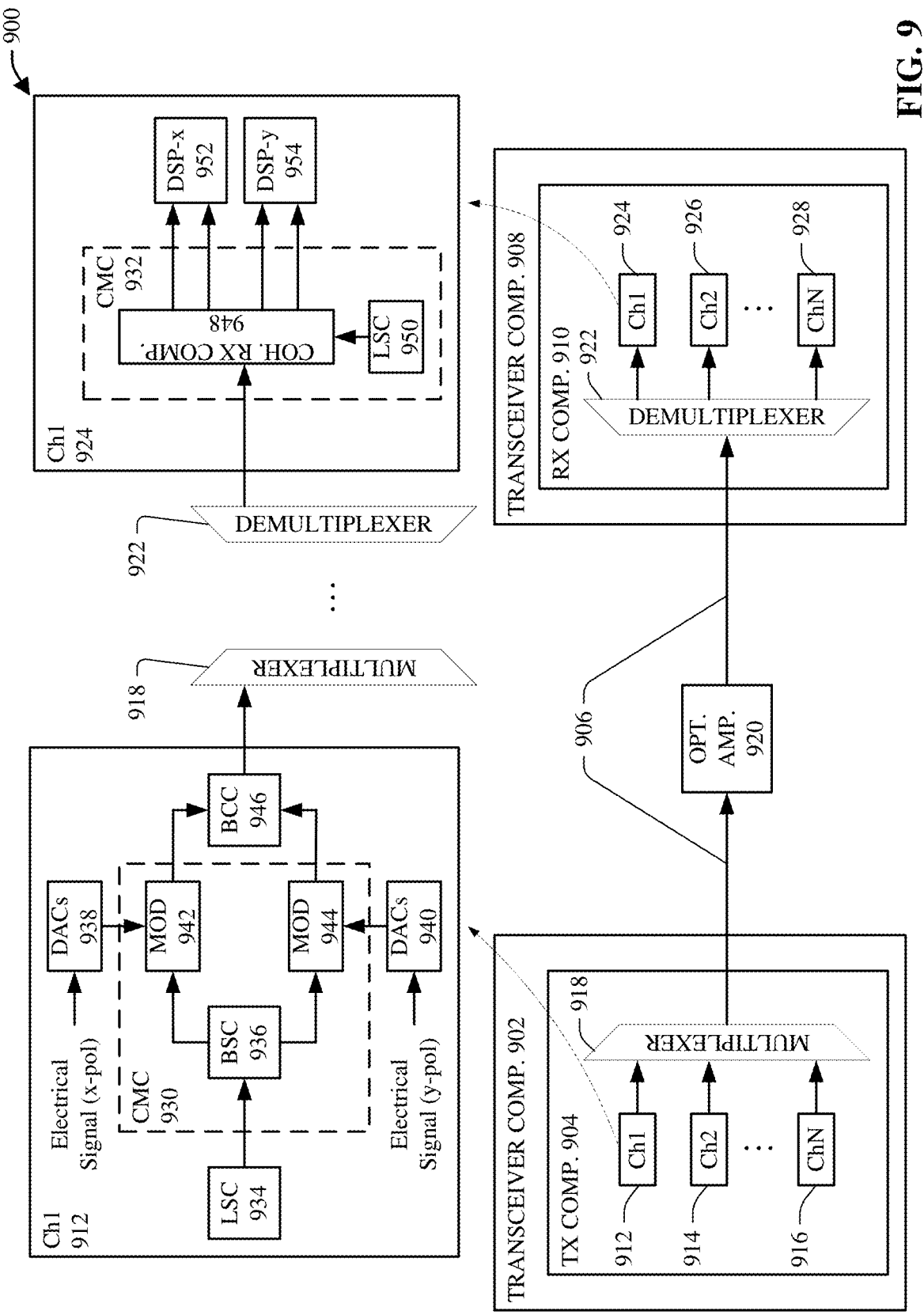
FIG. 9 depicts a block diagram of an example enhanced optical intensity modulation direct detection (IMDD) system that can employ timing synchronization pulses to facilitate managing communication of light signals and optical cables used to communicate the light signals to mitigate error associated with using optical cables to communicate light signals, in accordance with various aspects and embodiments of the disclosed subject matter.

FIG. 9 depicts a block diagram of an example enhanced optical intensity modulation direct detection (IMDD) system 900 that can employ timing synchronization pulses to facilitate managing communication of light signals and optical cables used to communicate the light signals to mitigate error associated with using optical cables to communicate light signals, in accordance with various aspects and embodiments of the disclosed subject matter. The system 900 can be an enhanced IMDD system that can employ CMCs, which can be or can comprise optical processor components, to determine errors in transmissions of light signals, determine impairments in optical cables, and compensate for such errors and for such impairments in optical cables.

The enhanced optical IMDD system 900 can comprise a transceiver component 902 (TRANCEIVER COMP. 902) that can include a transmitter component 904 (TX COMP.) that can transmit light signals, which can be encoded with data, via an optical cable 906 to another transceiver component 908 (TRANCEIVER COMP. 908), which can comprise a receiver component 910 (RX COMP.). The transmitter component 904 can communicate light signals of respective wavelengths via a set of channels, including $channel_1$ 912 (Ch1), $channel_2$ 914 (Ch2), up through $channel_N$ 916 (ChN), wherein N can be any desired integer number. The transmitter component 904 also can include a multiplexer component 918 (MULTIPLEXER) that can receive the respective light signals from the respective channels (e.g., 912, 914, and/or 916, . . . ), and can multiplex or combine the respective light signals to generate a multiplexed light signal, comprising the respective lights signals. The multiplexer component 918 can transmit the multiplexed light signal to the optical cable 906 for transmission to the receiver component 910.

In some embodiments, one or more optical amplifier components, including optical amplifier component 920 (OPT. AMP.), can be associated with (e.g., connected to, or integrated with) the optical cable 906 to facilitate amplifying the transmitted light signals (e.g., multiplexed light signal). Amplifying the transmitted light signals can facilitate transmitting the light signals over relatively long distances. As disclosed, amplifying transmitted signals also can introduce or amplify (e.g., increase) noise, such as ASE, in transmitted light signals.

At the receiving end, the receiver component 910 can comprise a demultiplexer component 922 (DEMULTI-PLEXER) that can receive the multiplexed light signal from the optical cable 906. The demultiplexer component 922 can demultiplex the multiplexed light signal to separate the respective light signals from the multiplexed light signal and distribute the respective light signals to respective channels of the receiver component 910, wherein the receiver component 110 can comprise a set of channels, including $channel_1$ 924 (Ch1), $channel_2$ 926 (Ch2), up through $channel_N$ 928 (ChN).

For reasons of brevity and clarity, further aspects and embodiments of the system 900 will now be described with regard to $channel_1$ 912 of the transmitter component 904 and $channel_1$ 924 of the receiver component 910. It is to be appreciated and understood that $channel_2$ 914 up through $channel_N$ 916 of the transmitter component 904 can comprise the same or similar components and functionality as $channel_1$ 912 of the transmitter component 904, and $channel_2$ 926 up through $channel_N$ 928 can comprise the same or similar components and functionality as $channel_1$ 924 of the receiver component 910. Further, for reasons of brevity and clarity, the transceiver component 902 is described as comprising a transmitter component 904, and the other transceiver component 908 is described as comprising a receiver component 910, but it is to be appreciated and understood that the transceiver component 902 also can comprise a receiver component, and the other transceiver component 908 can comprise a transmitter component.

In accordance with various embodiments, the system 900 can employ CMCs and techniques that can mitigate and/or overcome various causes associated with the relatively low data rate and limited reach (e.g., limited distance) in optical transmission systems, such as IMDD-type optical transmission systems, for example, for modern long-haul transmission (e.g., Internet backbone) and other purposes, such as disclosed herein. Such various causes can affect (e.g., negatively affect) traditional systems, such as CO-OFDM systems and traditional IMDD technologies.

In accordance with various embodiments, the transmitter component 904 can comprise or be associated with CMC 930, and the receiver component 910 can comprise or be associated with CMC 932. The CMC 930 and CMC 932 can be the same or similar as, and/or can comprise the same or similar functionality as, respective components (e.g., respectively named components), such as more fully described herein. The CMC 930 and CMC 932 can operate to enhance (e.g., increase) the data rate of the enhanced optical IMDD system 900, enhance (e.g., increase) the reach or distance of the enhanced optical IMDD system 900, determine and mitigate error associated with transmitting light signals via the optical cable 906, determine compensation actions that can be performed to mitigate the error, and perform, or initiate or facilitate performing, the compensation actions, to provide improved performance of the enhanced optical IMDD system 900 over other types of IMDD systems. It is to be appreciated and understood that, while the CMC 930 is being depicted as being part of $channel_1$ 912 of the transmitter component 904, and CMC 932 is being depicted as being part of $channel_1$ 924 of the receiver component 910, the disclosed subject matter is not so limited, as, in accordance with other embodiments, the CMC 930 can extend across and be associated with (e.g., part of or connected to) the various channels (e.g., channels 912, 914, and 916, . . . ) of the transmitter component 904, and the CMC 932 can extend across and be associated with (e.g., part of or connected to) the various channels (e.g., channels 924, 926, and 928, . . . ) of the receiver component 910.

Channel$_1$ 912 of the transmitter component 904 can comprise a light source component 934 (LSC 934) (e.g., an optical source) that can generate light signals (e.g., optical carriers) that can be used (e.g., manipulated) to carry data. Channel$_1$ 912 of the transmitter component 904 also can include a beam splitter component 936 (BSC) that can be associated with (e.g., connected to) the light source component 934. In some embodiments, the beam splitter component 936 can be a polarization beam splitter that can split or divide a light beam (e.g., light signal) into different beams of different polarization. For example, the beam splitter component 936 can comprise birefringent materials that can be utilized to facilitate splitting the light beam into separate light beams of different polarization, wherein a first light beam can have an x-polarization and a second light beam can have a y-polarization. In this example enhanced optical IMDD system 900, the disclosed subject matter is being described with regard to two different polarizations, x-polarization and y-polarization, for reasons of brevity and clarity. It is to be appreciated and understood though, that the enhanced optical IMDD system 900 can employ the beam splitter component 936 to split the light beam into a desired number of separate light beams having different polarizations, wherein the desired number can be two or greater than two (e.g., three, four, or five, . . . ).

Channel$_1$ 912 of the transmitter component 904 further can comprise a first set of DACs 938 and a second set of DACs 940. With regard to the x-polarization side, the first set of DACs 938 can receive data in the form of an electrical signal (Electrical Signal (x-pol)) and can convert the electrical signal (e.g., a digital signal) into an analog signal that can represent the data in analog form. With regard to the y-polarization side, the second set of DACs 940 also can receive data in the form of an electrical signal (Electrical Signal (y-pol)) and can convert the electrical signal (e.g., a digital signal) into an analog signal that can represent such data in analog form.

The CMC 930 can comprise a modulator component 942 (MOD 942) (e.g., encoder modulator component) and modulator component 944 (MOD 944) (e.g., encoder modulator component), wherein the modulator component 942 can be associated with (e.g., connected to) the first set of DACs 938 and the x-polarization side, and the modulator component 944 can be associated with the second set of DACs 940 and the y-polarization side. The modulator component 942 can modulate the first (e.g., x-polarization) light signal (e.g., first light signal as processed (e.g., squeezed and/or twisted) by the CMC 930) and encode the data (e.g., analog signal received from the first set of DACs 938) into the first light signal. The modulator component 944 can modulate the second (e.g., y-polarization) light signal (e.g., second light signal as processed (e.g., squeezed and/or twisted) by the CMC 930) and encode the data (e.g., analog signal received from the second set of DACs 940) into the second light signal.

Channel$_1$ 912 of the transmitter component 904 also can include a beam combiner component 946 that can be associated with (e.g., connected to) the modulator component 942 and modulator component 944. In some embodiments, the beam combiner component 946 can be a polarization beam combiner. The beam combiner component 946 can receive the first light signal, as modulated, encoded, and otherwise processed (e.g., squeezed and/or twisted), from the modulator component 942, and can receive the second light signal, as modulated, encoded, and otherwise processed (e.g., squeezed and/or twisted), from the modulator component 944. The beam combiner component 946 (BCC) can combine or integrate the first light signal and second light signal to produce a single cohesive light signal (e.g., light beam) that can comprise the respective data of the first light signal and second light signal. The beam combiner component 946 can be associated with (e.g., connected to an input of the multiplexer component 918 (as can the other beam combiner components of the other channels (e.g., 914, 916, . . . ) be associated with the multiplexer component 918). The beam combiner component 946 can communicate the single cohesive light signal to the multiplexer component 918. The multiplexer component 918 can multiplex or combine the respective cohesive light signals from the respective channels (e.g., 912, 914, 916, . . . ) to generate a multiplexed light signal, comprising the respective lights signals (e.g., respective cohesive light signals). The multiplexer component 918 can provide the multiplexed light signal to the optical cable 906 for transmission of the multiplexed light signal, via the optical cable 906, to the receiver component 910.

At the receiver end, as disclosed, the demultiplexer component 922 can receive the multiplexed light signal and can demultiplex the multiplexed light signal to separate the respective light signals from the multiplexed light signal and distribute the respective light signals to respective channels (e.g., channels 924, 926, 928, . . . ) of the receiver component 910. With further regard to channel$_1$ 924 of the receiver component 910, channel$_1$ 924 can comprise a coherent receiver component 948 (COH. RX COMP.) that can detect the light signals that are received by channel$_1$ 924, wherein the received light signals can be modulated light signals, comprising data associated with an x-polarization portion of the light signal and data associated with a y-polarization portion of the light signal. In some embodiments, the coherent receiver component 948 can comprise a coherent optical detector that can be associated with a light source component 950 (LSC 950) (e.g., optical source), wherein the light source component 950 can provide a coherent light signal to coherent optical detector of the coherent receiver component 948. The coherent optical detector can detect the respective portions (e.g., x-polarization portion, y-polarization portion) of the modulated light signal based at least in part on the modulated light signal and the coherent light signal.

In certain embodiments, the coherent receiver component 948 can demodulate and decode the x-polarization portion of the light signal to recover the data associated with the x-polarization portion of the light signal, and can demodulate and decode the y-polarization portion of the light signal to recover the data associated with the y-polarization portion of the light signal. For instance, the coherent receiver component 948 can convert the x-polarization portion of the light signal to an electrical signal that can comprise or represent the data associated with the x-polarization portion of the light signal, and can convert the y-polarization portion of the light signal to an electrical signal that can comprise or represent the data associated with the y-polarization portion of the light signal.

Channel$_1$ 924 of the receiver component 910 also can include a DSP component 952 (DSP-x) that can process the electrical signal associated with the x-polarization portion of the light signal, and a DSP component 954 (DSP-y) that can process the electrical signal associated with the y-polarization portion of the light signal. In some embodiments, the DSP component 952 and DSP component 954 can be associated with (e.g., connected to) the CMC 932, and, in other embodiments, the CMC 932 can comprise the DSP component 952 and DSP component 954. In still other embodiments, the DSP component 952 and DSP component 954 also can analyze the respective electrical signals associated with the respective portions of the light signal to determine error associated with the transmission of the light signal via the optical cable 906 and compensating for or mitigating the error. For instance, the CMC 932 can operate in conjunction with and/or can coordinate with the DSP component 952 and DSP component 954 with regard to determining error and compensating for or mitigating such error.

As more fully described herein, the CMC 932 and/or CMC 930 can perform enhanced analysis (as compared to the DSP component 952 and DSP component 954) on the respective portions of the light signal to determine the error associated with the transmission of the light signal via the optical cable 906 and compensate for or mitigate the error. For instance, the CMC 932 and/or CMC 930 can determine a compensation action that can reduce polarization mode dispersion in light signals transmitted via the optical cable 906, as more fully described herein. Further, as disclosed herein, the CMC 930 (and/or CMC 932) can reduce ASE (e.g., by squeezing light signals and/or by performing or initiating performance of a compensation action) and other negative impacts on transmissions of light signals via the optical cable 906. By performing such enhanced analysis on light signals, determining error associated with transmissions of light signals via the optical cable, determining and implementing compensation actions to mitigate such error, reducing ASE, reducing polarization mode dispersion, and/or mitigating other negative impacts in transmissions of light signals via the optical cable 906, the CMC 930 and/or CMC 932 can reduce reliance on the DSP component 952 and DSP component 954, and the associated DSP algorithm, to perform analysis on the respective electrical signals associated with the respective portions of the light signals to determine and compensate for error in light signal transmissions and/or can reduce power utilization, which can be beneficial as the signal power can be directly related to ASE. That is, reduced signal power can result in reduced ASE, which can result in less error and improved (e.g., longer or increased) transmission distances that can be attainable by the enhanced optical IMDD system 900.

In contrast to DSP components (e.g., DSP components of traditional IMDD systems, the CMC 930 and CMC 932 does not have to depend on a digital-to-analog translation of a light signal and information therein in order to examine the error per bit in the light signal or determine the logical understanding of which frames or frequencies of a light signals have drifted or become corrupted due to impairments in or associated with the optical cable 906. As disclosed herein, the CMC 930 and CMC 932 each can be or can comprise an optical signal processor, wherein such optical signal processor can be completely transparent and can be free from dependence on the DSP components 952 and 954 to process light signals, including in-flight metadata (e.g., timing synchronization pulses or other metadata) in the light signals.

With further regard to the processing (e.g., embedding timing synchronization pulses; squeezing and/or twisting) of light signals by the CMC 930, in some embodiments, the CMC 930 can process or at least partially process (e.g., squeeze and/or twist) a light signal emitted from the light source component 934 prior to the light signal being split by the beam splitter component 936. In other embodiments, the CMC 930 can process (e.g., squeeze and/or twist, and/or embed timing synchronization pulses in) the first and second light signals after the light signal has been split by the beam splitter component 936 to produce the first and second light signals.

For instance, the CMC 930 can embed, incorporate, or encode respective timing synchronization pulses in the first and second light signals in desired locations (e.g., time locations), as more fully described herein. For instance, the CMC 930 can include synchronization component (e.g., synchronization component 212; not shown in FIG. 9) that can generate respective timing synchronization pulses for the first and second light signals and can embed or facilitate incorporating the respective timing synchronization pulses in the first and second light signals. For example, the modulator components 942 and 944 can encode the respective timing synchronization pulses in the first and second light signals in connection with encoding the respective data in the first and second light signals. In some embodiments, such embedding, incorporation, or encoding of the respective timing synchronization pulses can be performed after the CMC 930 has squeezed and/or twisted the light signal from the light source component 934, or squeezed and/or twisted the first and second light signals after the light signal has been split by the beam splitter component 936.

As more fully described herein, the CMC 930 can process or squeeze light signals (e.g., light signal from the light source component 934, or the first and second light signals produced by splitting such light signal) that are to be transmitted (e.g., after further processing (e.g., encoding, modulating, and/or multiplexing, . . . ) from the transmitter component 904 via the optical cable 906 to reduce ASE, including ASE produced by or associated with the optical amplifier component 920, in the light signals. For instance, the CMC 930 can employ a squeezer component (e.g., squeezer component 216; not shown in FIG. 9, for reasons of brevity and clarity) to squeeze a light signal to generate a squeezed light signal that can reduce ASE and reduce quantum uncertainty in the light signal, wherein the squeezed light signal (e.g., after further processing) can be transmitted via the optical cable 906 to the receiver component 910. Such squeezing of light signals can mitigate noise that otherwise can be incurred after amplification of the light signals by the optical amplifier component 920. The CMC 930, by processing or squeezing light signals to lower the ASE associated with the light signals, can increase the reach of the enhanced optical IMDD system 900 (e.g., can increase the feasible or effective distance that such squeezed light signal can be transmitted (e.g., usably transmitted) via an optical cable 906) over other types of IMDD systems.

As more fully described herein, the CMC 930 also can process or twist light signals (e.g., light signal from the light source component 934, or the first and second light signals produced by splitting such light signal) that are to be transmitted (e.g., after further processing (e.g., encoding, modulating, and/or multiplexing, . . . ) from the transmitter component 904 via the optical cable 906 to the receiver component 910. For instance, the CMC 930 can employ a twisted light generator component (e.g., twisted light generator component 218; not shown in FIG. 9, for reasons of brevity and clarity) that can twist photons of the light signal (e.g., a squeezed light signal, or a light signal that has not been squeezed) to generate a twisted light signal that can have twisted photons that can have a desired number of twists. The higher the number of twists of the twisted photons of the twisted light signal, the more bits of data that can be encoded into the twisted light signal, as more fully described herein. By twisting the light signal, and encoding more bits of data into the twisted light signal than can be encoded into an ordinary, untwisted light signal, the CMC 930 can encode additional bits of data on each light pulse (e.g., each twisted photon) of the twisted light signal without having to utilize (e.g., consume) bandwidth. Accordingly, the transmitter component 904 of the enhanced optical IMDD system 900, by employing the CMC 930, can significantly increase the data bit rate of transmissions of light signals (e.g., twisted light signals encoded with data) via the optical cable 906 to the receiver component 910 or other destinations. As a result, the enhanced optical IMDD system 900 can provide for an enhanced (e.g., increased) data bit rate (e.g., can transmit data at a significantly higher bit rate), as compared to the relatively lower data bit rates of other types of IMDD system.

By utilizing twisted light in connection with the disclosed synchronization schemes, the CMC 930 also can provide further enhancements in the transmission of light signals (e.g., twisted light signals encoded with data) via the optical cable 906. For instance, the CMC 930 can place (e.g., insert) respective markers (e.g., timing synchronization pulses, metadata, or codes) on respective frames or frequencies of light signals that can be used in multiplexing the light signals (e.g., by the multiplexer component 918). Having dynamic encoding of these quantities (e.g., markers) can allow the CMC 930 and CMC 932 (at the receiving end) to perform micro-optimizations (e.g., desirably focused compensation actions) for any portion of the optical cable 906 (e.g., any portion of the optical fiber of the optical fiber cable), regardless of DSP computations (e.g., DSP computations performed by the receiver component 910). For example, the CMC 930 or CMC 932 can utilize the markers to re-modulate frequencies (e.g., change frequencies or wavelengths utilized for transmission of light signals via the optical cable 906) to a less disperse state. For instance, as more fully described herein (e.g., with regard to analyzing timing synchronization codes in light signals), based at least in part on the results of analyzing the markers (e.g., timing synchronization pulses, metadata, or codes) in light signals of different frequencies received by the receiver component 910 from the optical cable 906, the CMC 932 or CMC 930 can determine that certain frequencies can have a higher amount of dispersion (e.g., polarization mode dispersion) than other frequencies when the light signals are transmitted via the optical cable (e.g., due to impairment, degradation, or damage to the optical cable 906, or portion thereof). The CMC 932 or CMC 930 can determine a compensation action, such as, re-modulating frequencies to utilize the other frequencies that can be associated with a lower dispersion rate, and can utilize such other frequencies for light signals when transmitting lights signals via the optical cable 906 to achieve a desirably lower amount of dispersion.

As another example, based at least in part on the results of analyzing the markers (e.g., timing synchronization pulses, metadata, or codes) in light signals of different frequencies or wavelengths received by the receiver component 910 from the optical cable 906, the CMC 932 or CMC 930 can learn or determine characteristics associated with a particular portion of the optical cable 906, as more fully described herein. For instance, if the CMC 932 or CMC 930 determines that the particular portion of the optical cable 906 is degraded or impaired, which is negatively affecting transmission of light signals in that particular portion of the optical cable 906, the CMC 932 or CMC 930 can determine a compensation action to compensate for or mitigate such error and/or problems associated with that particular portion of the optical cable 906. For example, the compensation action can be to expand the distance between frames of the light signal (e.g., the multiplexed light signal) when such frames of the light signal are at or in proximity to the particular portion of the optical cable 906 to slow down (e.g., to dynamically slow down) the rate of traffic when such traffic is approaching the particular portion of the optical cable 906, and/or the compensation action can be to route the light signal, or a portion thereof (e.g., some of the frames of the light signal), via a different route (e.g., a different optical cable) to the receiver component 910 to avoid the particular portion of the optical cable 906 and/or to reduce traffic in the particular portion of the optical cable 906. As another example, if, based at least in part on the analysis results, the CMC 932 or CMC 930 determines that a certain portion of the optical cable 906 is performing well, the CMC 932 or CMC 930 can determine that the distance between frames of the light signal can be decreased in the certain portion of the optical cable 906, which can increase the data transmission rate (e.g., increase bandwidth) at least in that certain portion of the optical cable 906.

In some embodiments, the techniques employed by the CMC 932 and CMC 930 can enable sampling clock synchronization (e.g., by the transmitter component 904) to be decoupled from send-receive processing limitations (e.g., locations of the DSP locations). For instance, with regard to the transceiver component 908, the DSP components 952 and 954 can be focused on the demultiplexing from the x and y components (e.g., x-polarization portion of the light signal, y-polarization portion of the light signal) back to the light pulse. Time synchronization can be a mode selection that can be included in the settings. The settings and associated mode selections can comprise, for example, a no time synchronization setting, which can be used to select a no time synchronization mode, wherein the no time synchronization setting can indicate that no time synchronization is being employed with respect to the light signal; a time synchronization setting, which can be used to select a time synchronization mode, wherein the time synchronization setting can indicate that time synchronization is being employed with respect to the light signal; a twisted encoding setting, which can be used to select a twisted encoding mode, wherein the twisted encoding setting can indicate that an encoded twisted light signal is being utilized with respect to the light signal; and/or a non-twisted light signal encoding setting, which can be used to select a non-twisted light signal encoding mode, wherein that can indicate that an encoded non-twisted light signal is being employed with respect to the light signal. To facilitate decoupling the sampling clock synchronization from the send-receive processing limitations (e.g., locations of the DSP locations), the CMC 930 of or associated with the transmitter component 904 can embed or encode the desired setting (e.g., no time synchronization, time synchronization, twisted encoding, or non-twisted encoding, etc.) in the light pulse being sent from the transmitter component 904, wherein the light pulse can carry the desired setting that can indicate the desired associated mode. The CMC 932 associated with the receiver component 910 can receive the light signal, and can identify the setting (e.g., no time synchronization, time synchronization, twisted encoding, or non-twisted encoding, etc.) and associated mode in the light pulse that carries the setting information. As indicated, in some embodiments, the CMC 930 can utilize twisted light (e.g., can twist light signals to produce twisted light), wherein the CMC 930 can embed or encode the desired setting in the twisted light signal along with the bits of data that can be encoded in the twisted light signal.

In other embodiments, to facilitate decoupling the sampling clock synchronization from the send-receive processing limitations, the CMC 932, CMC 930, or another component(s) can set desired rules on specific transistors of the transceiver component 908 and/or transceiver component 902, wherein such rules can enable the transceiver component 908 and/or transceiver component 902 to be managed independently from a master controller of the transceiver component 908 and/or transceiver component 902. In certain embodiments, the setting of the rules for those specific transistors can be a desired software-defined strategy to facilitate managing the transceiver component 908 and/or transceiver component 902 independently from the master controller. As desired, such techniques of the disclosed subject matter can be implemented without having to deviate from a desired software-defined network (SDN) work flow that can be utilized for the transceiver components 908 and 902.

Figure 10:
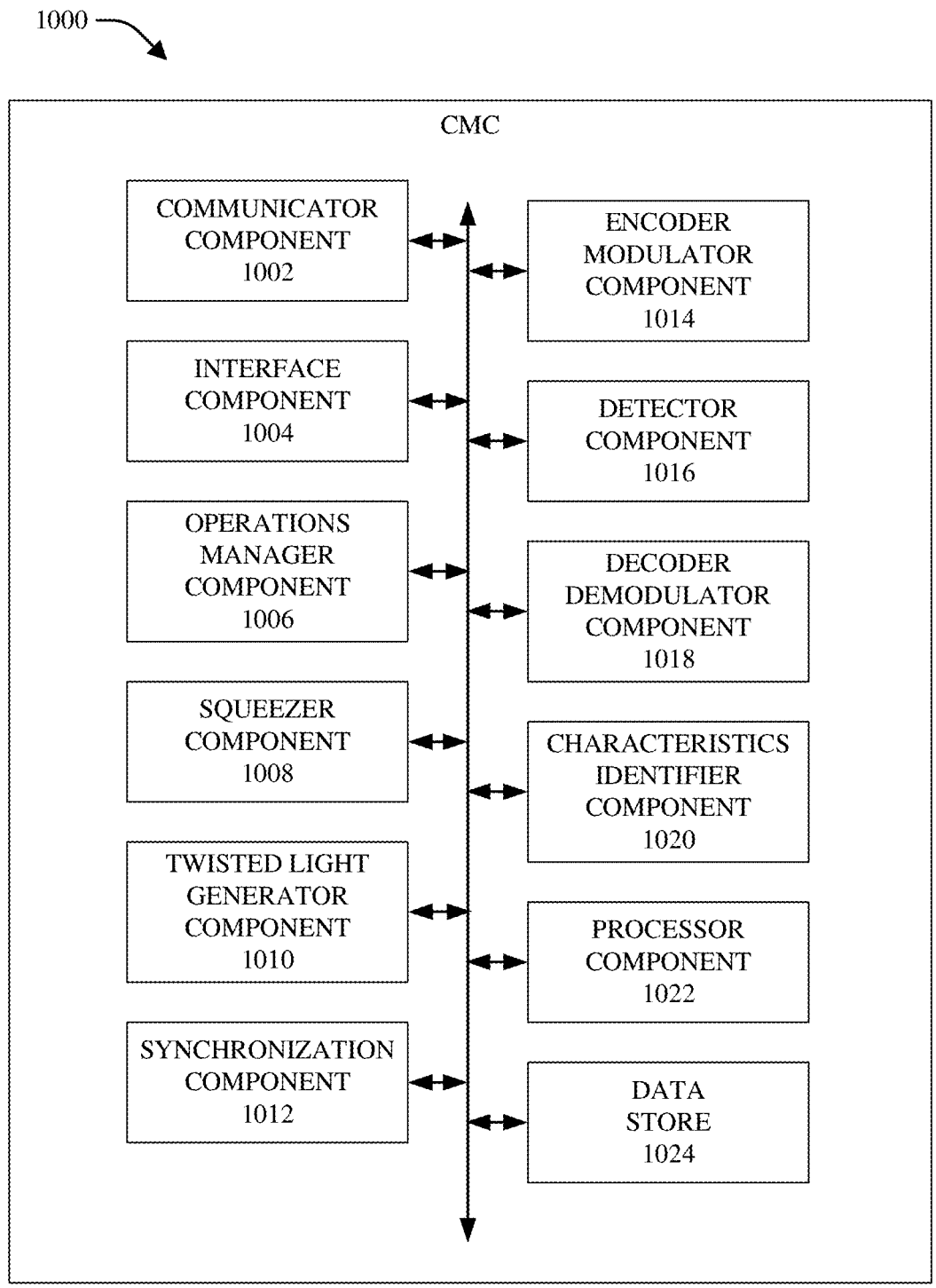
FIG. 10 illustrates a block diagram of an example communication management component (CMC), in accordance with various aspects and embodiments of the disclosed subject matter.

FIG. 10 illustrates a block diagram of an example CMC 1000, in accordance with various aspects and embodiments of the disclosed subject matter. The CMC 1000 can comprise a communicator component 1002, an interface component 1004, an operations manager component 1006, a squeezer component 1008, a twisted light generator component 1010, a synchronization component 1012, an encoder modulator component 1014, a detector component 1016, a decoder demodulator component 1018, a characteristics identifier component 1020, a processor component 1022, and a data store 1024. The squeezer component 1008, twisted light generator component 1010, synchronization component 1012, encoder modulator component 1014, detector component 1016, decoder demodulator component 1018, and characteristics identifier component 1020 each can respectively be the same as or similar to, and/or can comprise the same or similar functionality as, respective components (e.g., respectively named components), as more fully described herein.

The communicator component 1002 can transmit information from the CMC 1000 to another component(s) or device(s) (e.g., another CMC, an optical cable, a communication device, a network component or device, . . . ) and/or can receive information from the other component(s), or device(s). For instance, the communicator component 1002 can receive data (e.g., analog or digital data in the form of electrical signals) from a data source (e.g., a communication device, a network device, . . . ) for processing and transmission of the data to another device (e.g., a transceiver component or other communication device). In some embodiments, the CMC 1000 can be associated with a transceiver component, wherein the communicator component 1002 can receive information relating to analysis results from analysis of light signals (e.g., performed by a CMC at the receiving end) transmitted by the transceiver component, an error associated with the transmission of the light signals by the transceiver component, and/or a compensation action that can be performed to mitigate the error, as more fully described herein. In other embodiments, the CMC 1000 can be associated with a transceiver component at the receiver end (e.g., a transceiver component that received the light signals), wherein the communicator component 1002 can transmit information relating to analysis results from analysis of light signals transmitted by the sending transceiver component, an error associated with the transmission of the light signals by the sending transceiver component, and/or a compensation action that can be performed to mitigate the error, as more fully described herein.

The interface component 1004 can comprise one or more interfaces, including optical interfaces, that can interface the CMC 1000 with a light source component to enable the CMC 1000 to receive light signals from the light source component and can interface the CMC 1000 with an optical cable (e.g., a fiber optic cable) to enable the CMC 1000 to transmit or output processed light signals (e.g., encoded and/or twisted light signals, comprising bits of data and timing synchronization pulses) to the optical cable. The interface component 1004 also can comprise one or more interfaces that can enable the CMC 1000 to receive data (e.g., data in the form of electrical signals) from a user, a device (e.g., a communication device, a network device, . . . ), or another data source, or present (e.g., communicate, display, emit, . . . ) data to the user or a device.

The operations manager component 1006 can control (e.g., manage) operations associated with the CMC 1000. For example, the operations manager component 1006 can facilitate generating instructions to have components of the CMC 1000 perform operations, and can communicate respective instructions to respective components (e.g., communicator component 1002, interface component 1004, squeezer component 1008, twisted light generator component 1010, synchronization component 1012, . . . , processor component 1022, and/or data store 1024, . . . ) of the CMC 1000 to facilitate performance of operations by the respective components of the CMC 1000 based at least in part on the instructions, in accordance with defined communication management criteria, defined timing synchronization criteria, and associated communication management algorithm(s) or timing synchronization algorithm(s) (e.g., communication management algorithm(s) or timing synchronization algorithm(s) as disclosed, defined, recited, or indicated herein by the methods, systems, and techniques described herein). The operations manager component 1006 also can facilitate controlling data flow between the respective components of the CMC 1000 and controlling data flow between the CMC 1000 and another component(s) or device(s) (e.g., another CMC, a communication device, a network device, an optical cable, . . . ) associated with (e.g., connected to) the CMC 1000.

The processor component 1022 can work in conjunction with the other components (e.g., communicator component 1002, interface component 1004, operations manager component 1006, squeezer component 1008, twisted light generator component 1010, synchronization component 1012, . . . , processor component 1022, and/or data store 1024, . . . ) to facilitate performing the various functions of the CMC 1000. The processor component 1022 can employ one or more processors, microprocessors, or controllers that can process data, such as information relating to light signals, data, squeezing light signals, twisting light signals, timing synchronization pulses, encoding or modulating information (e.g., encoding or modulating information into light signals), detecting light signals, decoding or demodulating information (e.g., decoding or demodulating information contained in encoded or modulated light signals), characteristics associated with light signals or optical cables, errors associated with transmission of light signals, compensation actions, parameters, traffic flows, policies, defined communication management criteria, defined timing synchronization criteria, algorithms (e.g., communication management algorithm(s), timing synchronization algorithm(s)), protocols, interfaces, tools, and/or other information, to facilitate operation of the CMC 1000, as more fully disclosed herein, and control data flow between the CMC 1000 and other components (e.g., other CMCs, light source components, communication devices, network devices, data sources, applications, . . . ) associated with the CMC 1000.

The data store 1024 can store data structures (e.g., user data, metadata), code structure(s) (e.g., modules, objects, hashes, classes, procedures) or instructions, information relating to light signals, data, squeezing light signals, twisting light signals, timing synchronization pulses, encoding or modulating information (e.g., encoding or modulating information into light signals), detecting light signals, decoding or demodulating information (e.g., decoding or demodulating information contained in encoded or modulated light signals), characteristics associated with light signals or optical cables, errors associated with transmission of light signals, compensation actions, parameters, traffic flows, policies, defined communication management criteria, defined timing synchronization criteria, algorithms (e.g., communication management algorithm(s), timing synchronization algorithm(s)), protocols, interfaces, tools, and/or other information, to facilitate controlling operations associated with the CMC 1000. In an aspect, the processor component 1022 can be functionally coupled (e.g., through a memory bus) to the data store 1024 in order to store and retrieve information desired to operate and/or confer functionality, at least in part, to the communicator component 1002, interface component 1004, operations manager component 1006, squeezer component 1008, twisted light generator component 1010, synchronization component 1012, encoder modulator component 1014, detector component 1016, decoder demodulator component 1018, and characteristics identifier component 1020, processor component 1022, and/or data store 1024, etc., and/or substantially any other operational aspects of the CMC 1000.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 11-14. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 11:
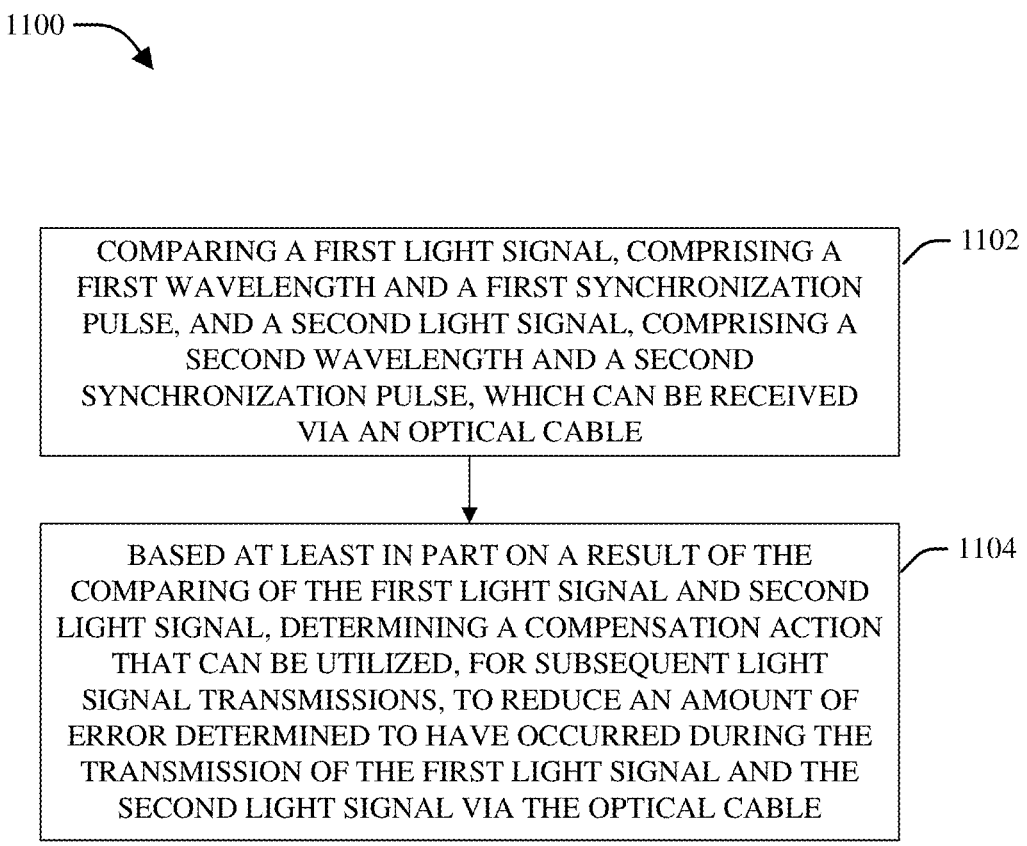
FIG. 11 illustrates a flow chart of an example method that can compensate for an error in the transmission of light signals via an optical cable, in accordance with various aspects and embodiments of the disclosed subject matter.

FIG. 11 illustrates a flow chart of an example method 1100 that can compensate for (e.g., reduce or minimize) an error in the transmission of light signals via an optical cable, in accordance with various aspects and embodiments of the disclosed subject matter. The method 1100 can be employed by, for example, a system comprising a CMC, a processor component (e.g., of or associated with the CMC), and/or a data store (e.g., of or associated with the CMC). In accordance with various embodiments, the CMC can be located at and/or associated with (e.g., part of or communicatively connected to) a receiver component (e.g., of a transceiver component) that can receive light signals via an optical cable, a transmitter component (e.g., of another transceiver component), which can send the light signals, or both the receiver component and transmitter component.

At 1102, a first light signal, comprising a first wavelength and a first synchronization pulse, and a second light signal, comprising a second wavelength and a second synchronization pulse, can be compared, wherein the first light signal and second light signal can be received via an optical cable. The first light signal and second light signal can be received at a receiver component associated with the optical cable (e.g., optical link, such as a fiber optic link). The first light signal and second light signal each can include respective information (e.g., encoded data), in addition to having respective synchronization pulses. The CMC can analyze the first light signal and second light signal, including analyzing the first synchronization pulse, second synchronization pulse, first wavelength, second wavelength, first light intensity or power, and/or second light intensity or power, etc.

At 1104, based at least in part on a result of the comparing of the first light signal and second light signal, a compensation action can be determined, wherein the compensation action can be utilized, for subsequent light signal transmissions, to reduce an amount of error determined to have occurred during the transmission of the first light signal and the second light signal via the optical cable. Based at least in part on a result of the comparing, the CMC can determine a desirable compensation action that can be utilized, for example, during subsequent light signal transmissions, to reduce the amount of error that was determined to have occurred during the transmission of the first light signal and the second light signal via the optical cable. The compensation action can comprise, for example, suspending one or more frequencies from encoding during a subsequent transmission of light signals via the optical cable, initiate a replacement, repair, or maintenance of a portion of the optical cable, adjust a transmission rate of the subsequent transmission of light signals, and/or adjust a route of the subsequent transmission of light signals, as more fully described herein.

For example, based at least in part on the results of the comparing and/or other analysis of the light signals, the CMC can determine that light signals at certain frequencies or wavelengths can be undesirably (e.g., negatively) affected when transmitted via the optical cable (e.g., due to damage or other issues affecting the performance of the optical cable). Accordingly, the CMC can determine a compensation action that suspends those certain frequencies or wavelengths from encoding of light signals during a subsequent transmission of light signals via the optical cable. When encoding light signals with information, the CMC or another component (e.g., encoder component) can utilize other light frequencies or wavelengths for encoding of the information, wherein those encoded light signals, having the other frequencies or wavelengths, can be desirably transmitted via the optical cable with a significantly lower amount of error than if the suspended frequencies or wavelengths been used for the light signals during encoding.

Figure 12:
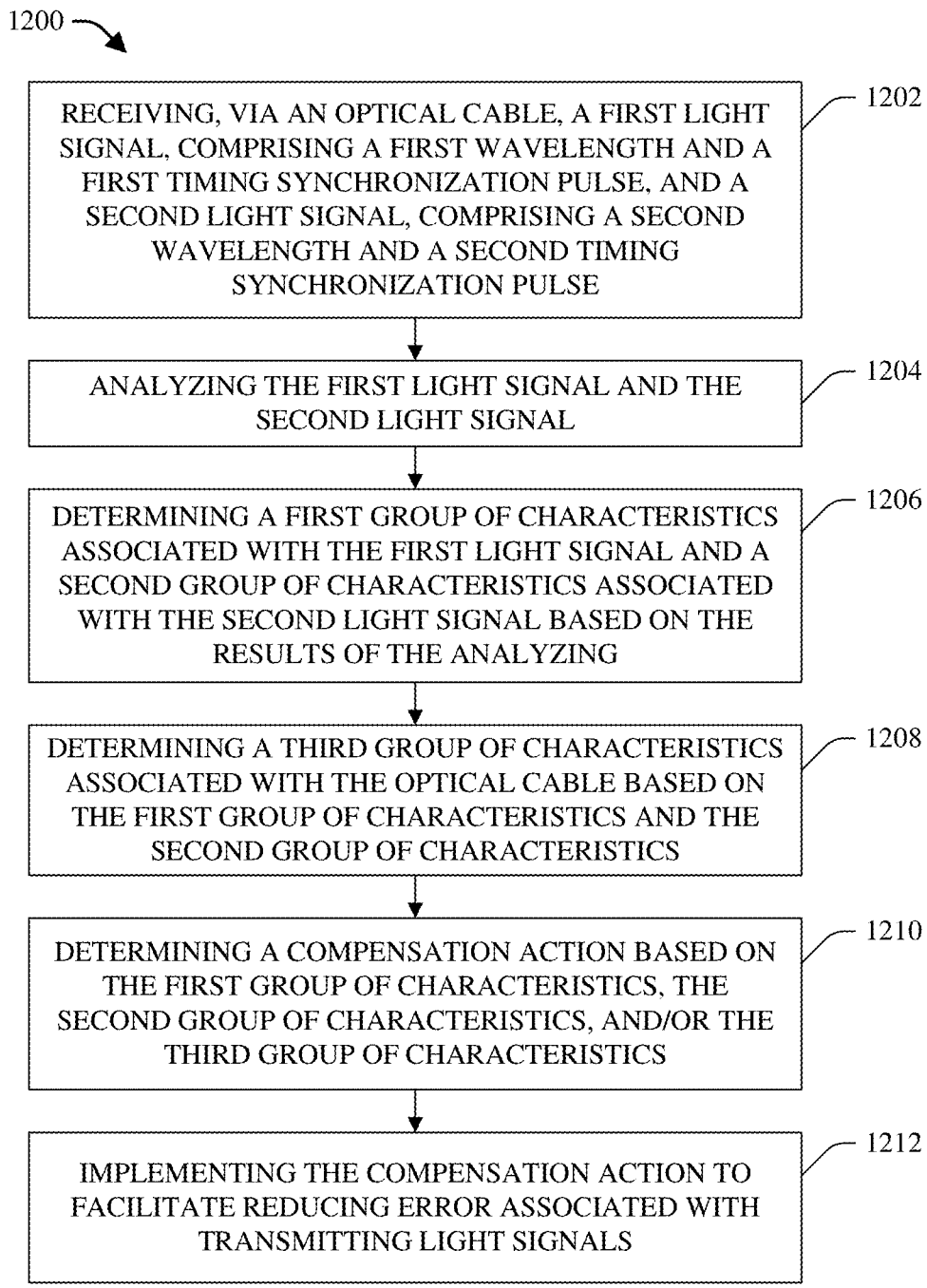
FIG. 12 presents a flow chart of another example method that can compensate for an error in the transmission of light signals via an optical cable, in accordance with various aspects and embodiments of the disclosed subject matter.

FIG. 12 presents a flow chart of another example method 1200 that can compensate for an error in the transmission of light signals via an optical cable, in accordance with various aspects and embodiments of the disclosed subject matter. The method 1200 can be employed by, for example, a system comprising a CMC, a processor component (e.g., of or associated with the CMC), and/or a data store (e.g., of or associated with the CMC). In accordance with various embodiments, the CMC can be located at and/or associated with (e.g., part of or communicatively connected to) a receiver component (e.g., of a transceiver component) that can receive light signals via an optical cable, a transmitter component (e.g., of another transceiver component), which can send the light signals, or both the receiver component and transmitter component.

At 1202, a first light signal, comprising a first wavelength and a first timing synchronization pulse, and a second light signal, comprising a second wavelength and a second timing synchronization pulse, can be received via an optical cable. A CMC (e.g., a CMC at the receiver component) can receive the first light signal and the second light signal from the optical cable.

At 1204, the first light signal and the second light signal can be analyzed. The CMC can analyze the first light signal and the second light signal to facilitate determining respective times of arrival of the respective light signals and other respective characteristics associated with the respective light signals.

At 1206, a first group of characteristics associated with the first light signal and a second group of characteristics associated with the second light signal can be determined based at least in part on the results of analyzing the first light signal and the second light signal. The CMC can determine the first group of characteristics associated with the first light signal and the second group of characteristics associated with the second light signal based at least in part on the results of analyzing the first and second light signals.

For instance, the CMC can determine the first group of characteristics comprising the time or location of the first timing synchronization pulse with respect to the first light signal, the first time of arrival of the first timing synchronization pulse, the first wavelength of the first light signal, the intensity level or power level of the first light signal as received by the receiver component, and/or other characteristics associated with the first light signal based at least in part on the results of the analyzing of the first light signal. The CMC also can determine the second group of characteristics comprising the time or location of the second timing synchronization pulse with respect to the second light signal, the second time of arrival of the second timing synchronization pulse, the second wavelength of the second light signal, the intensity level or power level of the second light signal as received by the receiver component, and/or other characteristics associated with the second light signal based at least in part on the results of the analyzing of the second light signal.

At 1208, a third group of characteristics associated with the optical cable can be determined based at least in part on the first group of characteristics associated with the first light signal and the second group of characteristics associated with the second light signal. As part of the analysis of the first and second light signals, the CMC can determine the third group of characteristics associated with the optical cable based at least in part on the first group of character-istics and the second group of characteristics. For instance, the CMC can compare the first group of characteristics and the second group of characteristics to each other (e.g., can compare respective characteristics of the first group of characteristics to respective characteristics of the second group of characteristics; and/or can compare the intersection(s) of multiple characteristics of the first group of characteristics and multiple characteristics of the second group of characteristics). Based at least in part on the results of such comparison, the CMC can determine the third group of characteristics associated with the optical cable.

For example, the CMC can determine the third group of characteristics associated with the optical cable, wherein the third group of characteristics can indicate frequencies or wavelengths associated with the optical cable that are determined by the CMC to be undesirable (e.g., unsuitable) for transmission of light signals having such frequencies or wavelengths because transmitting light signals using such frequencies or wavelengths can result in an undesirable amount of error in the transmission of such light signals via the optical cable. As another example, additionally or alternatively, the CMC can determine a characteristic associated with the optical cable that indicates a certain portion of the optical cable has been damaged, worn, or otherwise impacted (e.g., negatively impacted), wherein such damage, wear, or other impact can result in an undesirable amount of error in the transmission of such light signals via the certain portion of the optical cable.

At 1210, a compensation action can be determined, based at least in part on the first group of characteristics associated with the first light signal, the second group of characteristics associated with the second light signal, and/or the third group of characteristics associated with the optical cable, to reduce the amount of error associated with transmitting light signals. The CMC can determine the amount of error associated with transmitting light signals via the optical cable based at least in part on the first group of characteristics, the second group of characteristics, and/or the third group of characteristics. The CMC also can determine a compensation action that can be performed to reduce the amount of error associated with transmitting light signals based at least in part on the first group of characteristics, the second group of characteristics, and/or the third group of characteristics. The compensation action (e.g., determined by the CMC) can comprise, for example, suspending one or more frequencies from encoding during a subsequent transmission of light signals via the optical cable, initiate a replacement, repair, or maintenance of a portion of the optical cable, adjust a transmission rate of the subsequent transmission of light signals (e.g., via the optical cable, or via one or more optical cables), and/or adjust a route of the subsequent transmission of light signals (e.g., via the optical cable, or via one or more optical cables, which can include or not include the optical cable, or portion thereof), as more fully described herein.

At 1212, the compensation action can be implemented to facilitate reducing error associated with transmitting light signals. The CMC can implement or facilitate implementing the compensation action to facilitate reducing the amount of error associated with transmitting light signals. For example, the CMC can suspend or facilitate suspending one or more frequencies from encoding during a subsequent transmission of light signals via the optical cable. As another example, the CMC can communicate a recommendation or instruction to initiate the replacement, repair, or maintenance of a portion of the optical cable that is determined (e.g., by the CMC) to be damaged, worn, or otherwise undesirably impacted and determined to be contributing to the error associated with the transmission of the light signals (e.g., first and second light signals) via the optical cable.

Figure 13A:
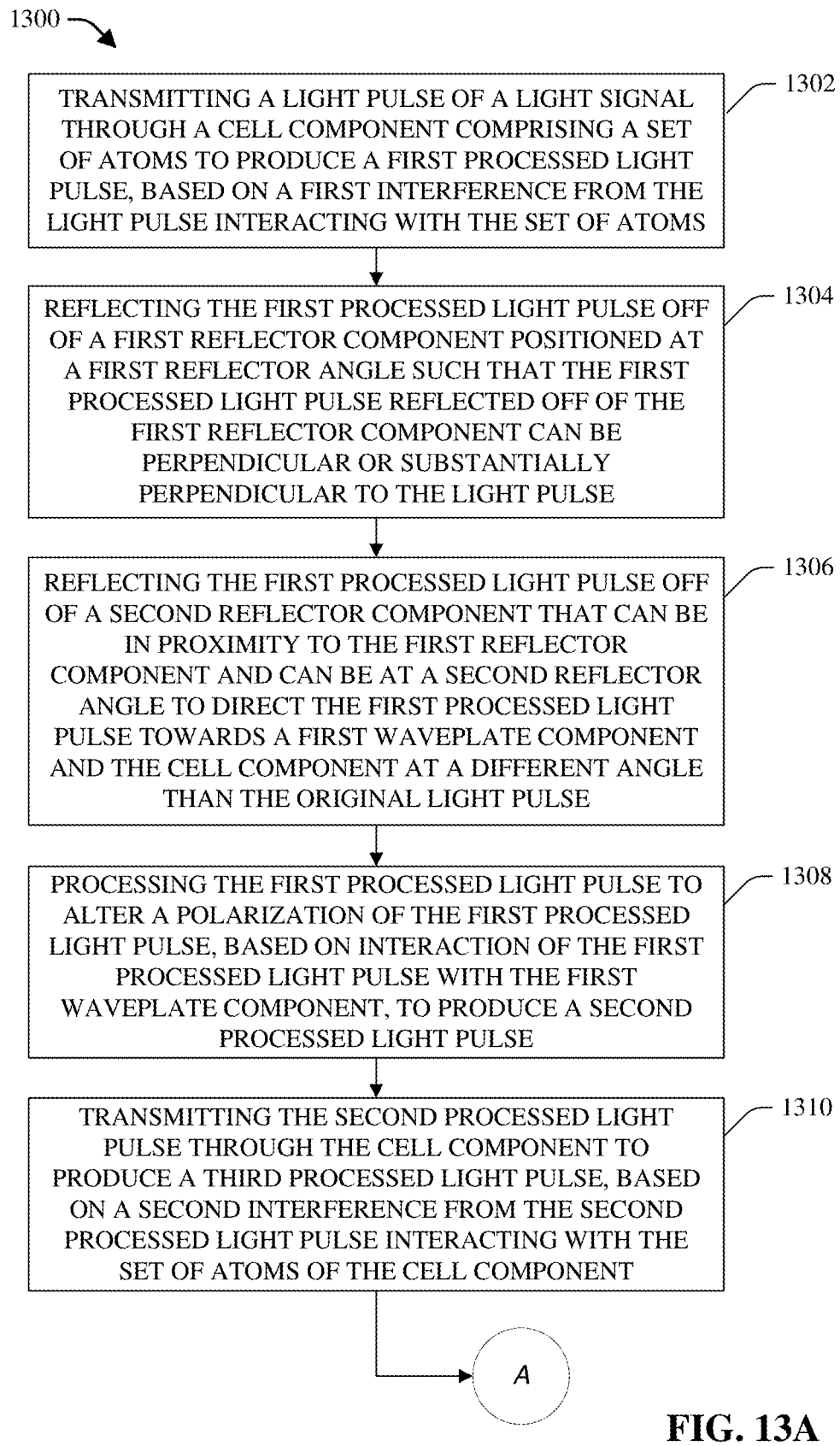
FIGS. 13A and 13B depict a flow chart of an example method that can squeeze lights signals using an optical interference-based technique to generate lights signals that can have a reduced quantum uncertainty, in accordance with various aspects and embodiments of the disclosed subject matter.
Figure 13B:
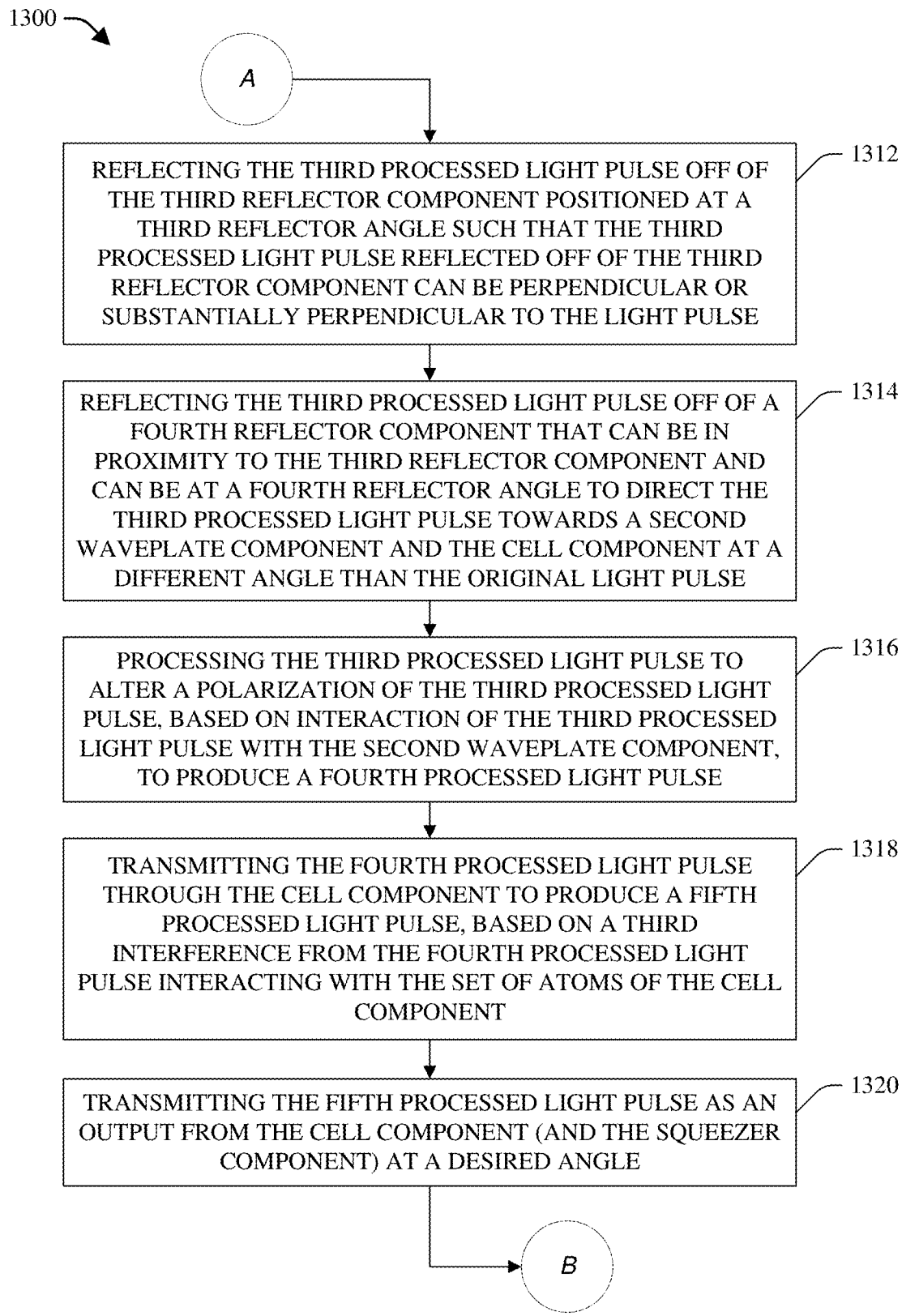

FIGS. 13A and 13B depict a flow chart of an example method 1300 that can squeeze lights signals using an optical interference-based technique to generate lights signals that can have a reduced quantum uncertainty, in accordance with various aspects and embodiments of the disclosed subject matter. The method 1300 can be employed by, for example, a system comprising a CMC, a processor component (e.g., of or associated with the CMC), and/or a data store (e.g., of or associated with the CMC). In some embodiments, the CMC can be located at and/or associated with (e.g., part of or communicatively connected to) a transmitter component (e.g., of a transceiver component) that can send light signals to a receiver component (e.g., of another transceiver component) via an optical cable.

At 1302, a light pulse of a light signal can be transmitted through a cell component comprising a set of atoms to produce a first processed light pulse, based at least in part on a first interference from the light pulse interacting with the set of atoms. The CMC can comprise a squeezer component that can transmit the light pulse, which can be produced and emitted by a light source component of or associated with the CMC. The squeezer component can transmit the light pulse through the cell component of the squeezer component, wherein the cell component can comprise a set of atoms, such as warm and/or cold atoms. An atom of the set of atoms can interact or interfere with the light pulse based at least in part on the respective $\sigma^+$ and $\sigma^-$, and the associated $\Delta$ value, of the atom. In some embodiments, the light signal can be a polarized coherent light signal (e.g., polarized coherent laser beam) under off-resonant Faraday interactions with the atoms (e.g., warm or cold atoms) of the cell component. The light pulse can interact with the atoms of the cell component to produce the first processed light pulse, based at least in part on the first interference (e.g., first optical interference) of the light pulse resulting from the light pulse interacting with the set of atoms, wherein the first processed light pulse can be output from the cell component.

At 1304, the first processed light pulse can be reflected off of a first reflector component positioned at a first reflector angle such that the first processed light pulse reflected off of the first reflector component can be perpendicular or substantially perpendicular to the light pulse. The squeezer component can comprise the first reflector component, which can be positioned at the first reflector angle to reflect the first processed light pulse off the first reflector component, based at least in part on the first reflector angle, such that the first processed light pulse can be perpendicular or substantially perpendicular to the light pulse. It is to be appreciated and understood that, in other embodiments, as desired, the first reflector component can be positioned at another desired first reflector angle that can reflect the first processed light pulse at a different desired angle that is not perpendicular or substantially perpendicular to the light pulse.

At 1306, the first processed light pulse can be reflected off of a second reflector component that can be in proximity to the first reflector component and can be at a second reflector angle to direct the first processed light pulse towards a first waveplate component and the cell component at a different angle than the original light pulse. The squeezer component can comprise a second reflector component that can be in proximity to the first reflector component and can be at the second reflector angle to reflect the first processed light pulse off the second reflector component, based at least in part on the second reflector angle, to direct the first processed light pulse towards the first waveplate component of the squeezer component and the cell component at a different angle than the original light pulse. Such different angle between the light pulse and the first processed light pulse can be relatively small (e.g., less than 10 degrees).

At 1308, the first processed light pulse can be processed to alter a polarization of the first processed light pulse, based at least in part on interaction of the first processed light pulse with the first waveplate component, to produce a second processed light pulse. The first processed light pulse can be passed through the first waveplate component. In some embodiments, the first waveplate component can be a half-wave plate. Based at least in part on the interaction of the first processed light pulse with the first waveplate component, the polarization of the first processed light pulse can be altered by the first waveplate component to produce the second processed light pulse.

At 1310, the second processed light pulse can be transmitted through the cell component to produce a third processed light pulse, based at least in part on a second interference from the second processed light pulse interacting with the set of atoms of the cell component. The second processed light pulse output from the first waveplate component can be transmitted through the cell component to produce the third processed light pulse, based at least in part on a second interference (e.g., second optical interference) from the second processed light pulse interacting with the set of atoms of the cell component. As the second processed light pulse passes through the cell component, the second processed light pulse can interact with the atoms of the cell component to produce the third processed light pulse, based at least in part on the second interference of the second processed light pulse resulting from the second processed light pulse interacting with the set of atoms. The third processed light pulse can be output from the cell component towards a third reflector component of the squeezer component.

At this point, the method 1300 can proceed to reference point A, wherein, as depicted in FIG. 13B, the method 1300 can proceed from reference point A.

At 1312, the third processed light pulse can be reflected off of the third reflector component positioned at a third reflector angle such that the third processed light pulse reflected off of the third reflector component can be perpendicular or substantially perpendicular to the light pulse. It is to be appreciated and understood that, in other embodiments, as desired, the third reflector component can be positioned at another desired third reflector angle that can reflect the third processed light pulse at a different desired angle that is not perpendicular or substantially perpendicular to the light pulse.

At 1314, the third processed light pulse can be reflected off of a fourth reflector component that can be in proximity to the third reflector component and can be at a fourth reflector angle to direct the third processed light pulse towards a second waveplate component and the cell component at a different angle than the original light pulse. The squeezer component can comprise the fourth reflector component, which can be in proximity to the third reflector component and can be at the fourth reflector angle to reflect the third processed light pulse off the fourth reflector component, based at least in part on the fourth reflector angle, to direct the third processed light pulse towards the second waveplate component of the squeezer component and the cell component at a different angle than the original light pulse. Such different angle between the light pulse and the third processed light pulse can be relatively small (e.g., less than 10 degrees), and can be done, in part, for example, to enable the third reflector component and fourth reflector component to be respectively positioned such that they do not interfere with the initial transmission of the light pulse to the cell component.

At 1316, the third processed light pulse can be processed to alter a polarization of the third processed light pulse, based at least in part on interaction of the third processed light pulse with the second waveplate component, to produce a fourth processed light pulse. The third processed light pulse can be passed through the second waveplate component. In some embodiments, the second waveplate component can be a half-wave plate. Based at least in part on the interaction of the third processed light pulse with the second waveplate component, the polarization of the third processed light pulse can be altered by the second waveplate component to produce the fourth processed light pulse.

At 1318, the fourth processed light pulse can be transmitted through the cell component to produce a fifth processed light pulse, based at least in part on a third interference from the fourth processed light pulse interacting with the set of atoms of the cell component. The fourth processed light pulse output from the second waveplate component can be transmitted through the cell component to produce the fifth processed light pulse, based at least in part on the third interference (e.g., third optical interference) resulting from the fourth processed light pulse interacting with the set of atoms of the cell component. As the fourth processed light pulse passes through the cell component, the fourth processed light pulse can interact with the atoms of the cell component to produce the fifth processed light pulse, based at least in part on the third interference of the fourth processed light pulse resulting from the fourth processed light pulse interacting with the atoms.

At 1320, the fifth processed light pulse can be transmitted as an output from the cell component and the squeezer component at a desired angle, $\phi$, relative to the original light pulse, wherein the desired angle can be relatively small (e.g., less than 10 degrees, and close to 0 degrees in some embodiments) and can be an angle that is sufficient for the fifth processed light pulse to not be interfered with by the first reflector component as the fifth processed light pulse (e.g., squeezed light signal) is output from the squeezer component.

The method 1300 can desirably reduce quantum uncertainty for the output light signal (e.g., output light pulse), as compared to the original light signal (e.g., original light pulse) by employing the interference (e.g., the first interference, second interference, and third interference) of the three atom-light interactions, which can cancel entanglement between the atoms and the output light, while maintaining the effective nonlinear interaction between atoms.

In some embodiments, the method 1300 can proceed to reference point B, wherein the method 1400 can proceed from reference point B to further process the output light pulse (e.g., the fifth processed light pulse, which can be a squeezed light signal) from the squeezer component to generate a twisted light signal.

Figure 14:
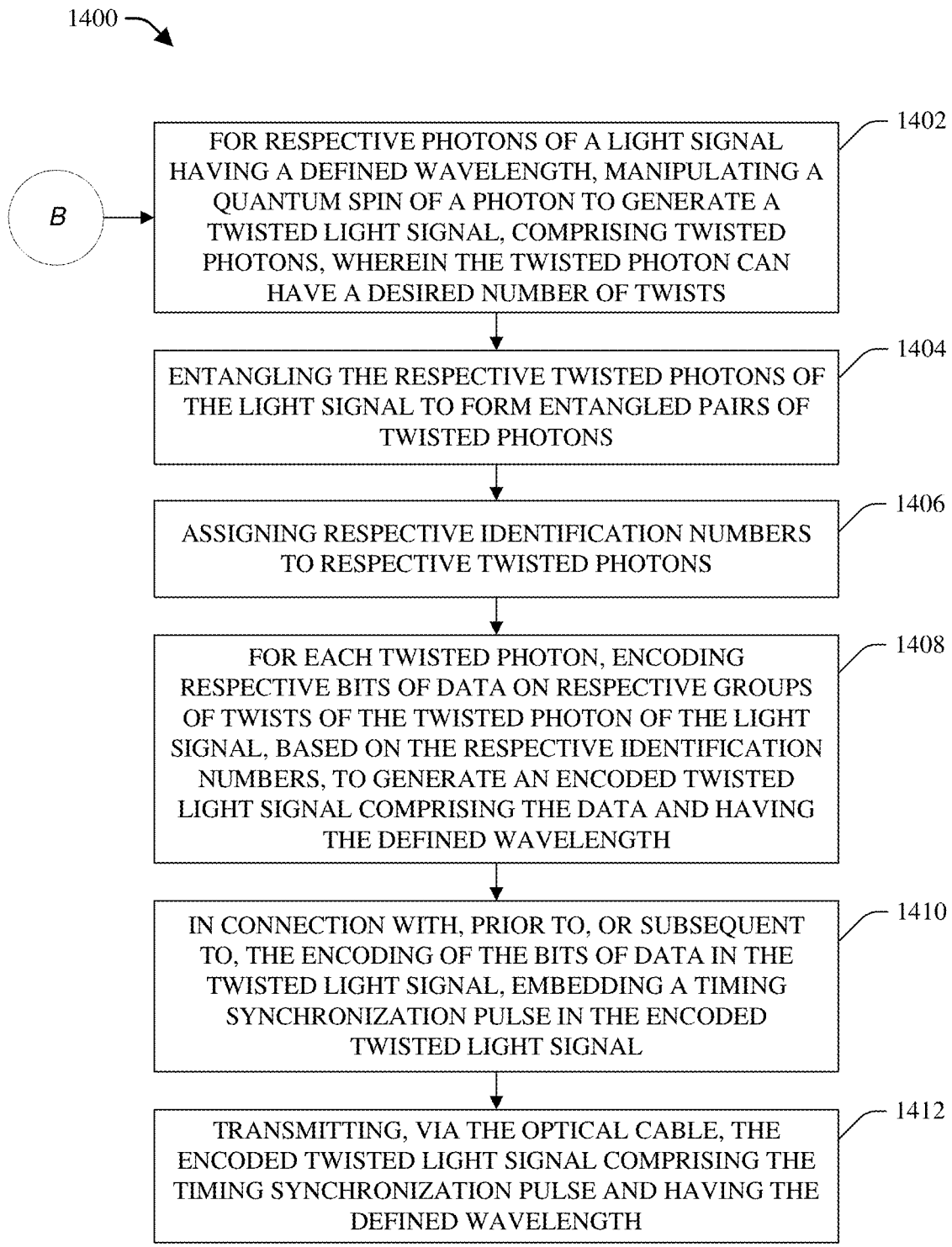
FIG. 14 illustrates a flow chart of an example method that can generate encoded twisted lights signals, in accordance with various aspects and embodiments of the disclosed subject matter.

FIG. 14 illustrates a flow chart of an example method 1400 that can generate encoded twisted lights signals, in accordance with various aspects and embodiments of the disclosed subject matter. The method 1400 can be employed by, for example, a system comprising a CMC, a processor component (e.g., of or associated with the CMC), and/or a data store (e.g., of or associated with the CMC). In some embodiments, the CMC can be located at and/or associated with (e.g., part of or communicatively connected to) a transmitter component (e.g., of a transceiver component) that can send light signals to a receiver component (e.g., of another transceiver component) via an optical cable. In some embodiments, the method 1400 can proceed from reference point B of method 1300 to receive a squeezed light signal (e.g., the output light signal from method 1300).

At 1402, for respective photons of a light signal having a defined wavelength, a quantum spin of a photon can be manipulated to generate a twisted light signal, comprising twisted photons, wherein the twisted photon can have a desired number of twists. With regard to the respective photons of the light signal, the CMC can manipulate the quantum spin of the photon to generate the twisted light signal comprising twisted photons, wherein the twisted photon can have a desired number of twists. For example, the CMC can manipulate the quantum spin of the photon to generate a twisted photon that can have 90,000 twists (or more twists or less twists). While a traditional photon (e.g., untwisted photon) can carry one bit of data, a twisted photon can carry, for example, fifteen bits of data (or more or less than fifteen bits of data depending in part on the number of twists of the twisted photon).

In some embodiments, the CMC can combine or fuse respective twisted photons with respective electrons to produce hybrid photon/electron particles, wherein each hybrid photon/electron particle can have the properties of both a photon (e.g., twisted photon) and an electron. The hybrid photon/electron particles (e.g., as encoded with bits of data) can be transmitted via an optical cable, which can be a fiber optic cable. In certain embodiments, the fiber optic cable can comprise a topological insulator material, which can be conductive on its surface, but insulating at its interior. The fiber optic cable often can curve or bend. As the hybrid photon/electron particles are transmitted through the fiber optic cable, comprising the topological insulator material, the hybrid photon/electron particles, can trace the surface of the topological insulator material, without losing power or signal quality, or at least without losing significant power or signal quality. In contrast, a photon (e.g., twisted photon) transmitted via a fiber optic cable, which does not have the topological insulator material, can lose power and signal quality due to signal losses from having to reflect off the sides of the fiber optic cable due to the curves or bends in the fiber optic cable. Also, a fiber optic cable, comprising topological insulator material, can be produced (e.g., spun) into ultra thin threads (e.g., nano-threads, which can be, for example, 0.01 of a micron in width), which can be significantly smaller than the transmission fiber of certain other types of fiber optic cable, which can be relatively thick (e.g., approximately 200 microns). As a result, an optic cable comprising the topological insulator material can transmit approximately 20,000 times more data than those certain other types of fiber optic cable.

It is to be appreciated and understood that the operations of the method 1400, while further described herein with regard to a twisted photon, also can be extended to be performed with regard to a hybrid photon (e.g., twisted photon)/electron particle.

At 1404, the respective twisted photons of the light signal can be entangled to form entangled pairs of twisted photons. The CMC can entangle or facilitate entangling respective pairs of twisted photons to form the entangled pairs of twisted photons.

At 1406, respective identification numbers can be assigned to respective twisted photons. The CMC can assign respective identification numbers (e.g., serial numbers or address numbers) to the respective twisted photons, for example, to encode the respective twisted photons with respective identification numbers. As an example, the CMC can encode an entangled pair of twisted photons with identification numbers 1000000000 (e.g., 512 twists) and 1000000001 (e.g., 513 twists). That is, the CMC can map twisted photons to their entangled partner twisted photons.

At 1408, for each twisted photon, respective bits of data can be encoded on respective groups of twists of the twisted photon of the light signal, based at least in part on the respective identification numbers, to generate an encoded twisted light signal comprising the data and having the defined wavelength. For each twisted photon, the CMC can encode or facilitate encoding (e.g., using an encoder component) the respective bits of data on the respective groups of twists of the twisted photon of the light signal to generate the encoded twisted light signal having the defined wavelength, based at least in part on the respective identification numbers. At the receiving end (e.g., after the encoded twisted light signal has been transmitted via the optical cable to the receiver component), the respective identification numbers of the respective twisted photons can be utilized, for example, during decoding of the encoded twisted light signal by the receiver component (e.g., employing a decoder component) to identify or recover the respective bits of data from the respective groups of twists of each twisted photon of the encoded twisted light signal.

At 1410, in connection with, prior to, or subsequent to, the encoding of the bits of data in the twisted light signal to generate the encoded twisted light signal having the defined wavelength, a timing synchronization pulse can be embedded in the encoded twisted light signal. In connection with, prior to, or subsequent to, the encoding of the bits of data in the twisted light signal to generate the encoded twisted light signal, the CMC can embed the timing synchronization pulse in the encoded twisted light signal having the defined wavelength. In some embodiments, employing the method 1400, or as otherwise described herein, the CMC can generate a second encoded twisted light signal, comprising second data bits and having a second defined wavelength, wherein the CMC can embed a second timing synchronization pulse in the second encoded twisted light signal.

At 1412, the encoded twisted light signal, comprising the timing synchronization pulse and having the defined wavelength, can be transmitted via the optical cable. The CMC can transmit or facilitate transmitting (e.g., via a transmitter component of or associated with the CMC) the encoded twisted light signal via the optical cable. In some embodiments, employing the method 1400, or as otherwise described herein, the CMC also can transmit or facilitate transmitting, via the optical channel, a second encoded twisted light signal, comprising second data bits, a second timing synchronization pulse, and having a second defined wavelength.

Figure 15:
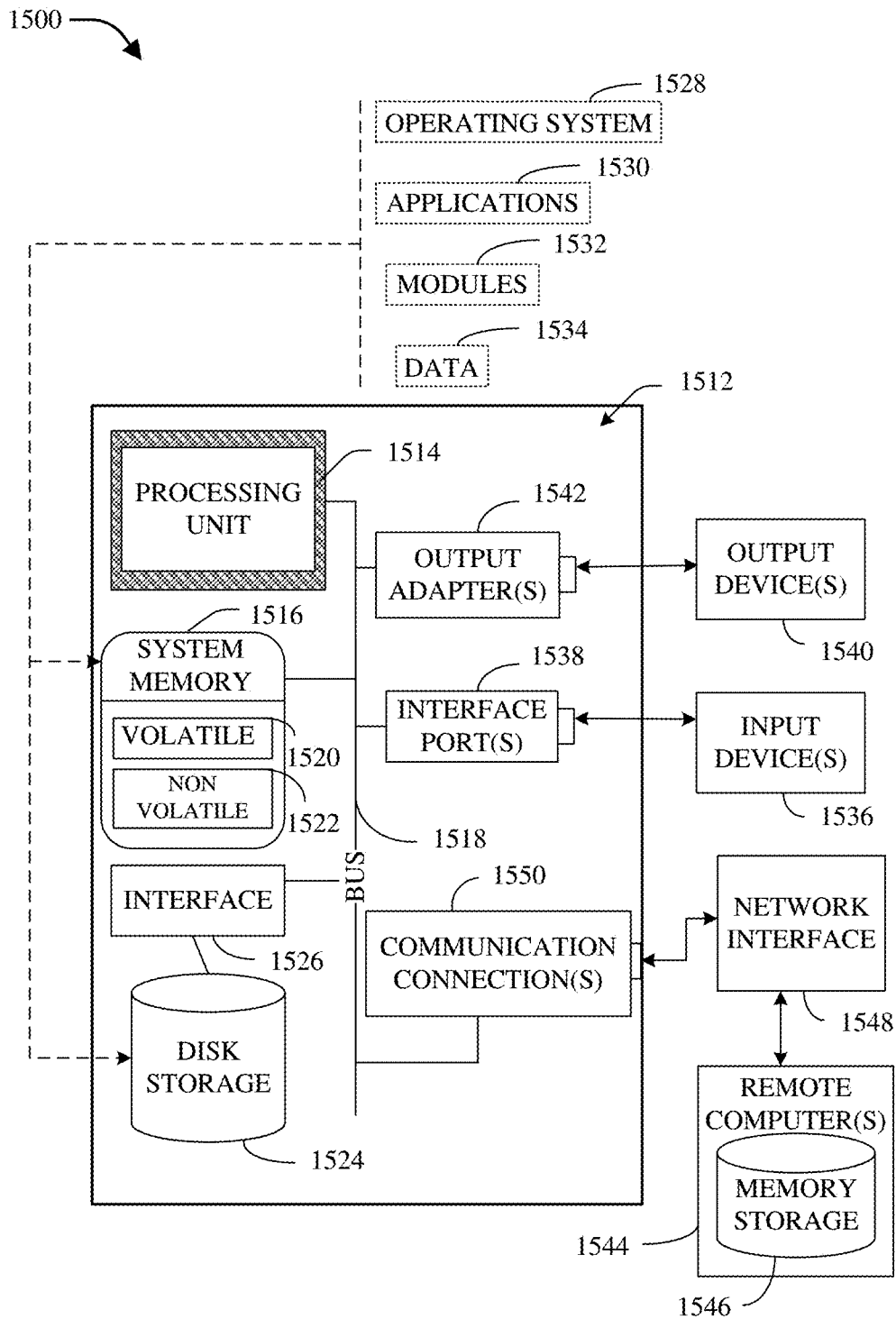
FIG. 15 is a schematic block diagram illustrating a suitable operating environment.
Figure 16:
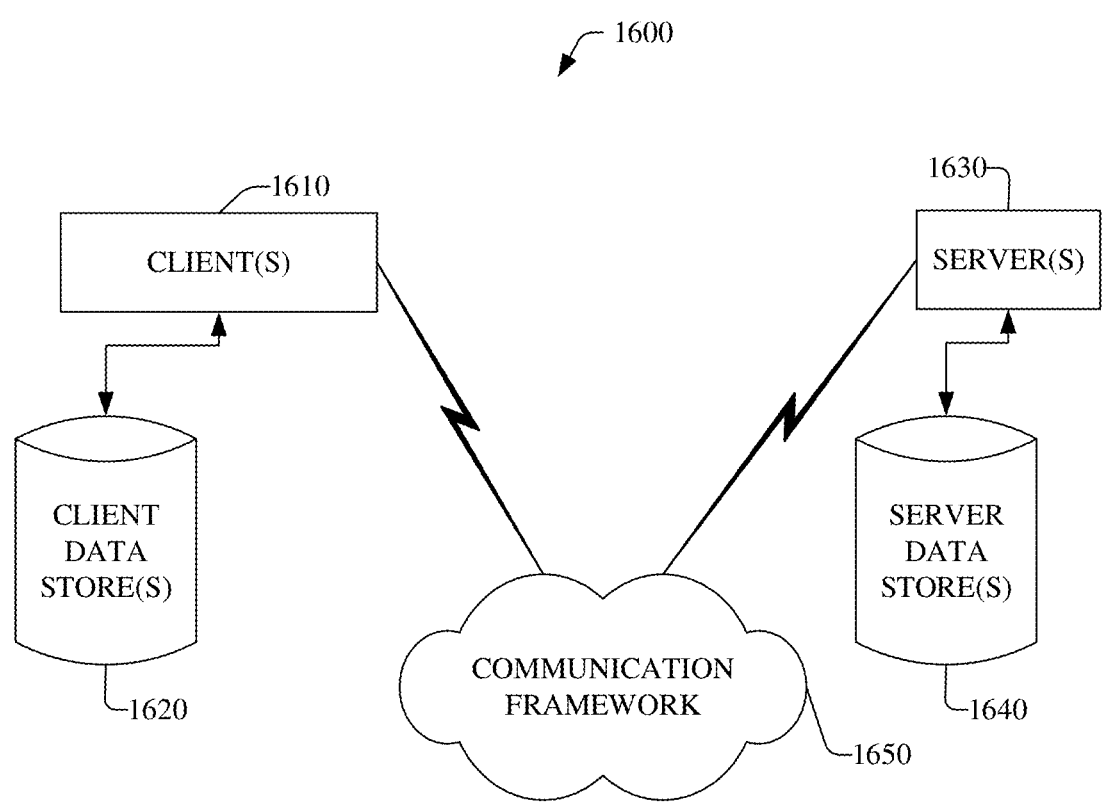
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 15, a suitable environment 1500 for implementing various aspects of this disclosure includes a computer 1512. The computer 1512 includes a processing unit 1514, a system memory 1516, and a system bus 1518. It is to be appreciated that the computer 1512 can be used in connection with implementing one or more of the systems, components, or methods shown and described in connection with FIGS. 1-14, or otherwise described herein. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 also includes removable/non-removable, volatile/non-volatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

FIG. 15 also depicts software that acts as an intermediary between users and the basic computer resources described in the suitable operating environment 1500. Such software includes, for example, an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored, e.g., in system memory 1516 or on disk storage 1524. It is to be appreciated that this disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample-computing environment 1600 (e.g., computing system) with which the subject matter of this disclosure can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing this disclosure, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. The client(s) 1610 are operatively connected to one or more client data store(s) 1620 that can be employed to store information local to the client(s) 1610. Similarly, the server(s) 1630 are operatively connected to one or more server data store(s) 1640 that can be employed to store information local to the servers 1630.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., transceiver component, transmitter component, receiver component, communication management component, optical signal processor, synchronization component, squeezer component, twisted light generator component, detector component, encoder modulator component, decoder demodulator component, characteristics identifier component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   comparing a first optical carrier and a second optical carrier that are received via an optical cable, wherein the first optical carrier has a first wavelength and a first timing synchronization pulse that is embedded in a first time location in the first optical carrier, wherein the first time location of the first timing synchronization pulse in the first optical carrier is determined based on a first randomized number, wherein the second optical carrier has a second wavelength and a second timing synchronization pulse that is embedded in a second time location in the second optical carrier, wherein the second time location of the second timing synchronization pulse in the second optical carrier is determined based on a second randomized number, wherein the comparing comprises comparing the first time location of the first timing synchronization pulse and the second time location of the second timing synchronization pulse, and comparing the first wavelength and the second wavelength, and wherein the comparing results in a comparison result; and
   determining an error that occurred during a transmission of the first optical carrier and the second optical carrier via the optical cable based on the comparison result to facilitate mitigating the error.

2. The system of claim 1, wherein the first optical carrier comprises a twisted light signal that comprises a twisted photon, and wherein the operations further comprise:
   encoding respective bits of data on respective groups of twists of the twisted photon of the twisted light signal.

3. The system of claim 2, wherein a first number of the respective bits of data that is able to be encoded on the twisted photon increases as a second number of twists of the twisted photon increases.

4. The system of claim 1, wherein the first timing synchronization pulse is transmitted in the first optical carrier and the second timing synchronization pulse is transmitted in the second optical carrier concurrently or at respective times that are known by a receiver device that receives the first optical carrier and the second optical carrier.

5. The system of claim 1, wherein the operations comprise:
   determining a characteristic of the optical cable based on an analysis result of analyzing the first optical carrier and the second optical carrier, wherein the analyzing comprises the comparing, and wherein the analysis result comprises the comparison result; and
   determining a compensation action that mitigates the error based on the characteristic of the optical cable.

6. The system of claim 5, wherein the comparing comprises:
   comparing a first time of arrival of the first timing synchronization pulse of the first optical carrier and a second time of arrival of the second timing synchronization pulse of the second optical carrier; and
   comparing a first group of characteristics associated with the first optical carrier and a second group of characteristics associated with the second optical carrier.

7. The system of claim 6, wherein the first group of characteristics comprises the first time location of the first timing synchronization pulse embedded in the first optical carrier, the first time of arrival of the first timing synchronization pulse, the first wavelength of the first optical carrier, a first light intensity level of the first optical carrier, or a first power level of the first optical carrier.

8. The system of claim 6, wherein the operations further comprise:
   determining a third group of characteristics of the optical cable based on the first group of characteristics and the second group of characteristics, wherein the third group of characteristics comprises the characteristic, and wherein the determining of the compensation action comprises determining the compensation action based on the first group of characteristics, the second group of characteristics, or the third group of characteristics.

9. The system of claim 5, wherein the operations further comprise:
   communicating information relating to the compensation action to a source device associated with the optical cable, wherein the source device transmitted the first optical carrier and the second optical carrier.

10. The system of claim 5, wherein the operations further comprise:
    performing the compensation action to mitigate the error with regard to a subsequent transmission of a third optical carrier, wherein the performing of the compensation action comprises:
    suspending at least one frequency from an encoding of data in the third optical carrier during the subsequent transmission of the third optical carrier via the optical cable;
    initiating a replacement of a portion of the optical cable;
    initiating a repair or a maintenance of the portion of the optical cable;
    adjusting a transmission rate of the subsequent transmission of the third optical carrier; or adjusting a route of the subsequent transmission of the third optical carrier.

11. The system of claim 1, wherein the first randomized number is a first random or pseudo-random number, and wherein the second randomized number is a second random or pseudo-random number.

12. The system of claim 1, wherein the operations further comprise:
receiving setting information embedded or encoded in the first optical carrier, wherein the setting information indicates a subgroup of nodes utilized in connection with the transmission of the first optical carrier and the second optical carrier, wherein a group of modes comprises the subgroup of modes, and wherein the group of modes comprises a no time synchronization mode, a time synchronization mode, a twisted encoding mode, or a non-twisted encoding mode;
determining the subgroup of modes utilized in connection with the transmission of the first optical carrier and the second optical carrier based on the setting information; and
processing the first optical carrier and the second optical carrier based on the subgroup of modes.

13. The system of claim 1, wherein the optical cable is an optical transmissive media comprising a fiber optic cable, and wherein the first optical carrier comprises a light signal emitted from a light source comprising a light emitting diode light source, a chemical light source, a halogen light source, a xenon light source, a metal halide light source, or a laser light source.

14. A method, comprising:
analyzing, by a system comprising a processor, a first light signal and a second light signal that are received via an optical link, wherein the first light signal has a first wavelength and a first synchronization pulse that is embedded in a first time location in the first light signal, wherein the first time location of the first synchronization pulse in the first light signal is determined based on a first randomized number, wherein the second light signal has a second wavelength and a second synchronization pulse that is embedded in a second time location in the second light signal, and wherein the second time location of the second synchronization pulse in the second light signal is determined based on a second randomized number, the analyzing comprising generating an analysis result based on analyzing the first time location of the first synchronization pulse and the second time location of the second synchronization pulse, and analyzing the first wavelength and the second wavelength; and
determining, by the system, an error that occurred during a transmission of the first light signal and the second light signal via the optical link based on the analysis result, to facilitate reducing the error.

15. The method of claim 14, further comprising:
determining, by the system, a characteristic of the optical link based on the analysis result; and
determining, by the system, a compensation action that mitigates the error based on the characteristic of the optical link.

16. The method of claim 15, wherein the analyzing further comprises comparing a first time of arrival of the first synchronization pulse of the first light signal and a second time of arrival of the second synchronization pulse of the second light signal, and wherein the method further comprises:

determining a first group of characteristics associated with the first light signal and a second group of characteristics associated with the second light signal based on the analysis result, wherein the analysis result further comprises a first comparison result of the comparing of the first time of arrival and the second time of arrival, and wherein the first group of characteristics comprises the first time location of the first synchronization pulse embedded in the first light signal, the first time of arrival of the first synchronization pulse, the first wavelength of the first light signal, a first light intensity level of the first light signal, or a first power level of the first light signal,
wherein the analyzing further comprises comparing the first group of characteristics and the second group of characteristics resulting in a second comparison result, and wherein the determining of the characteristic of the optical link comprises determining the characteristic of the optical link based on the second comparison result.

17. The method of claim 15, wherein the determining of the error comprises determining an amount of the error, and wherein the method further comprises:
executing, by the system, the compensation action to reduce the amount of the error with regard to a subsequent transmission of a third light signal, wherein the executing of the compensation action comprises:
suspending at least one frequency from an encoding of data in the third light signal during the subsequent transmission of the third light signal via the optical link;
initiating a replacement of a portion of the optical link;
initiating a repair or a maintenance of the portion of the optical link;
adjusting a transmission rate of the subsequent transmission of the third light signal; or
adjusting a route of the subsequent transmission of the third light signal.

18. A method, comprising:
embedding, by a system comprising a processor, a first synchronization pulse in a first time location in a first optical carrier carrying first signals of a first wavelength and a second synchronization pulse in a second time location in a second optical carrier carrying second signals of a second wavelength, wherein the first time location of the first synchronization pulse in the first optical carrier is determined based on a first random number, and wherein the second time location of the second synchronization pulse in the second optical carrier is determined based on a second random number; and
transmitting, by the system, the first optical carrier and the second optical carrier via an optical cable, wherein an error associated with the transmitting of the first optical carrier and the second optical carrier via the optical cable is determined based on a result of analyzing the first time location of the first synchronization pulse and the second time location of the second synchronization pulse, and analyzing the first wavelength and the second wavelength.

19. The method of claim 18, wherein the result is a first result, and wherein the method further comprises:
receiving, by the system, the information relating to the error from a receiver device that received the first optical carrier and the second optical carrier, wherein the information is representative of the first time location of the first synchronization pulse, the second time location of the second synchronization pulse, the first wavelength of the first optical carrier, and the second wavelength of the second optical carrier;

determining, by the system, an attribute of the optical cable based on a second result of analyzing the information, wherein the attribute indicates a performance degradation of the optical cable that resulted in the error;

based on the attribute, determining, by the system, a compensation action that mitigates the performance degradation of the optical cable to reduce a subsequent error associated with a subsequent transmission of a third optical carrier via the optical cable; and performing, by the system, the compensation action in connection with the subsequent transmission.

20. The method of claim 18, further comprising:

processing, by the system, a light signal via optical interference to generate a processed light signal that has reduced quantum uncertainty than the light signal with regard to a phase or an amplitude;

manipulating, by the system, quantum spins of photons of the processed light signal to generate a twisted light signal comprising twisted photons, wherein the first optical carrier comprises the twisted light signal; and encoding, by the system, respective bits of data on respective groups of twists of a twisted photon of the twisted photons of the twisted light signal.

* * * * *